United States Patent
Natori

(10) Patent No.: US 7,916,342 B2
(45) Date of Patent: Mar. 29, 2011

(54) PRINT CONTROL APPARATUS AND METHOD

(75) Inventor: Hideo Natori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 12/071,183

(22) Filed: Feb. 19, 2008

(65) Prior Publication Data
US 2008/0151282 A1 Jun. 26, 2008

Related U.S. Application Data

(62) Division of application No. 10/303,981, filed on Nov. 26, 2002, now Pat. No. 7,440,134.

(30) Foreign Application Priority Data

Nov. 30, 2001 (JP) .................................. 2001-366873

(51) Int. Cl.
*G06F 15/00* (2006.01)
*G06F 15/16* (2006.01)
(52) U.S. Cl. .......... 358/1.3; 358/1.9; 358/1.15; 709/203
(58) Field of Classification Search .................. 358/1.3, 358/1.9, 1.12, 1.15, 1.11, 1.18, 296; 709/203
See application file for complete search history.

(56) References Cited

U.S. PATENT DOCUMENTS

| 5,844,689 | A | | 12/1998 | Kawase | 358/296 |
| 5,943,680 | A | * | 8/1999 | Shimizu et al. | 715/209 |
| 6,313,920 | B1 | * | 11/2001 | Dresevic et al. | 358/1.11 |
| 6,351,317 | B1 | * | 2/2002 | Sasaki et al. | 358/1.15 |
| 6,693,720 | B1 | | 2/2004 | Livingston | 358/1.15 |
| 6,788,428 | B1 | * | 9/2004 | Shimokawa | 358/1.15 |
| 6,791,709 | B1 | * | 9/2004 | Nakamura et al. | 358/1.18 |
| 6,985,243 | B1 | * | 1/2006 | Matsueda | 358/1.15 |
| 7,064,858 | B2 | * | 6/2006 | Iwai et al. | 358/1.2 |
| 2002/0046238 | A1 | * | 4/2002 | Estavillo et al. | 709/203 |
| 2002/0051179 | A1 | * | 5/2002 | Someno et al. | 358/1.15 |

FOREIGN PATENT DOCUMENTS

JP 11219265 A * 8/1999

* cited by examiner

Primary Examiner — King Y Poon
Assistant Examiner — Allen H Nguyen
(74) Attorney, Agent, or Firm — Fitzpatrick, Cella, Harper & Scinto

(57) ABSTRACT

This invention is targeted to realize preview displaying by using a system spooler. In the print system according to this invention, when an application program designates printing of a document, document data is spooled into EMF spool file 4. At the same time, previewer 3 is started to transmit a printing image generation request to print processor 5. The print processor 5 reads the data subjected to preview displaying out of the EMF spool file 4, have printer graphic driver 6 generate image data that has an appropriate display size, and informs the name of the image data file to the previewer 8, which then displays the image data.

12 Claims, 14 Drawing Sheets

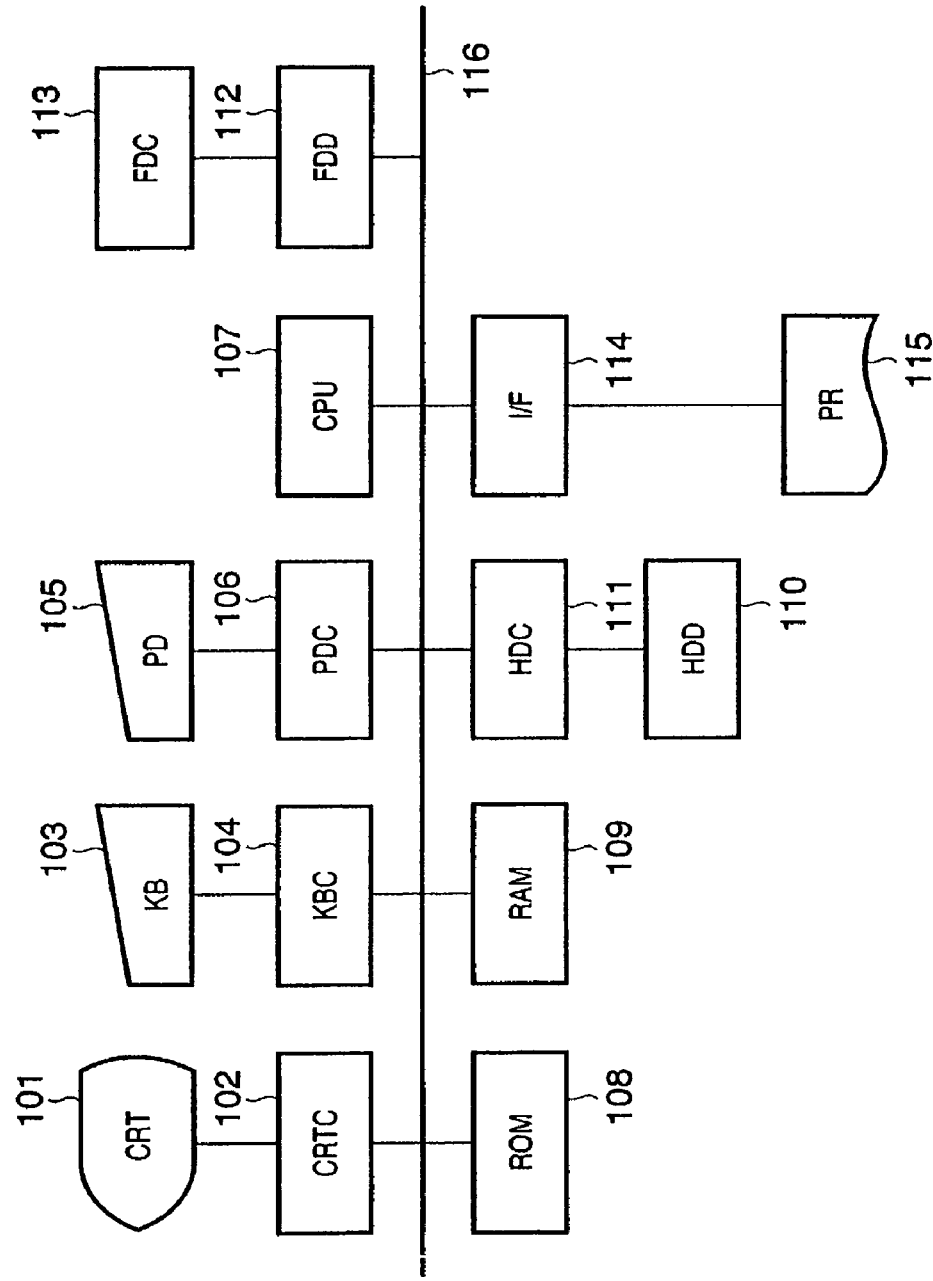

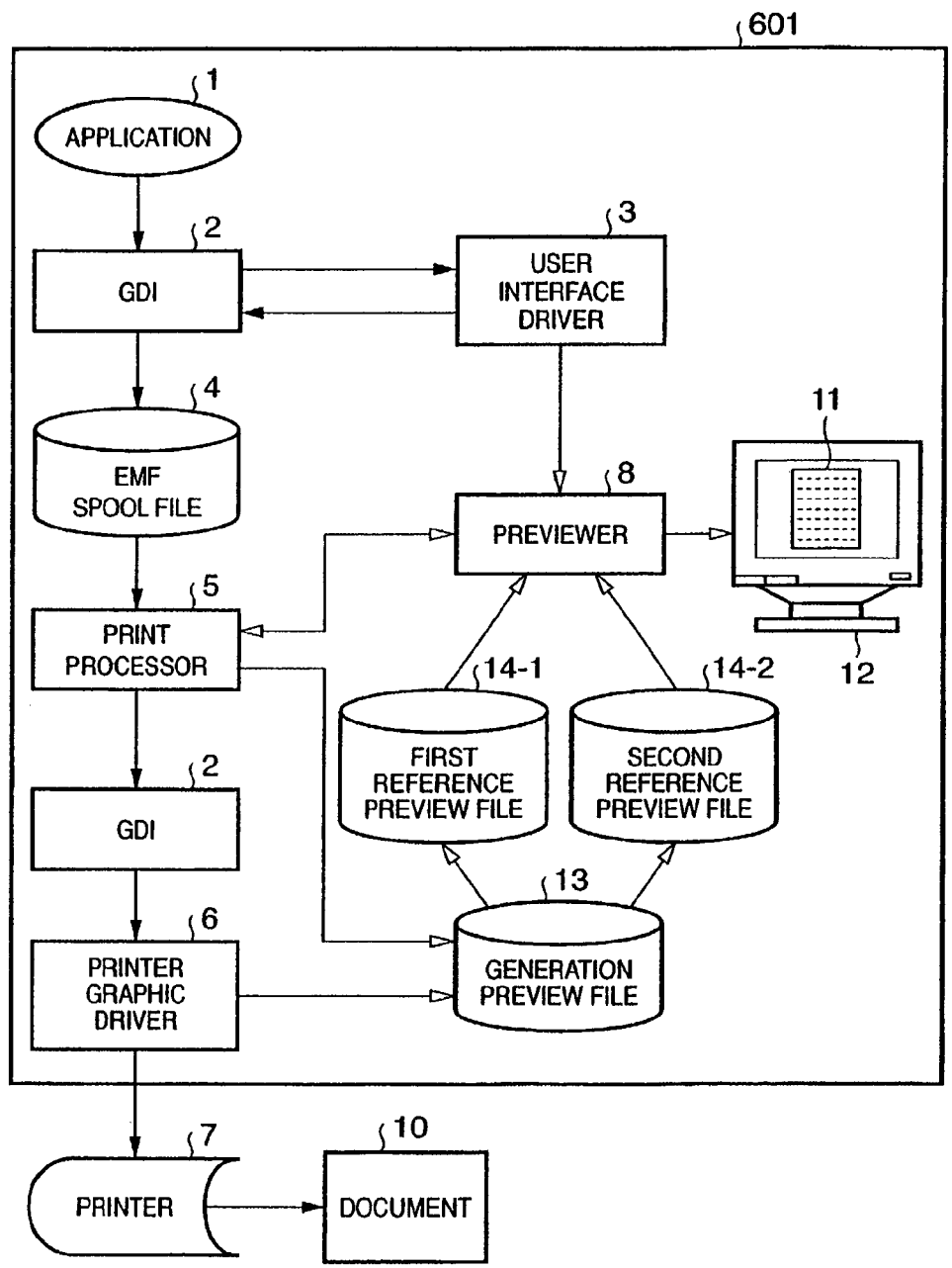

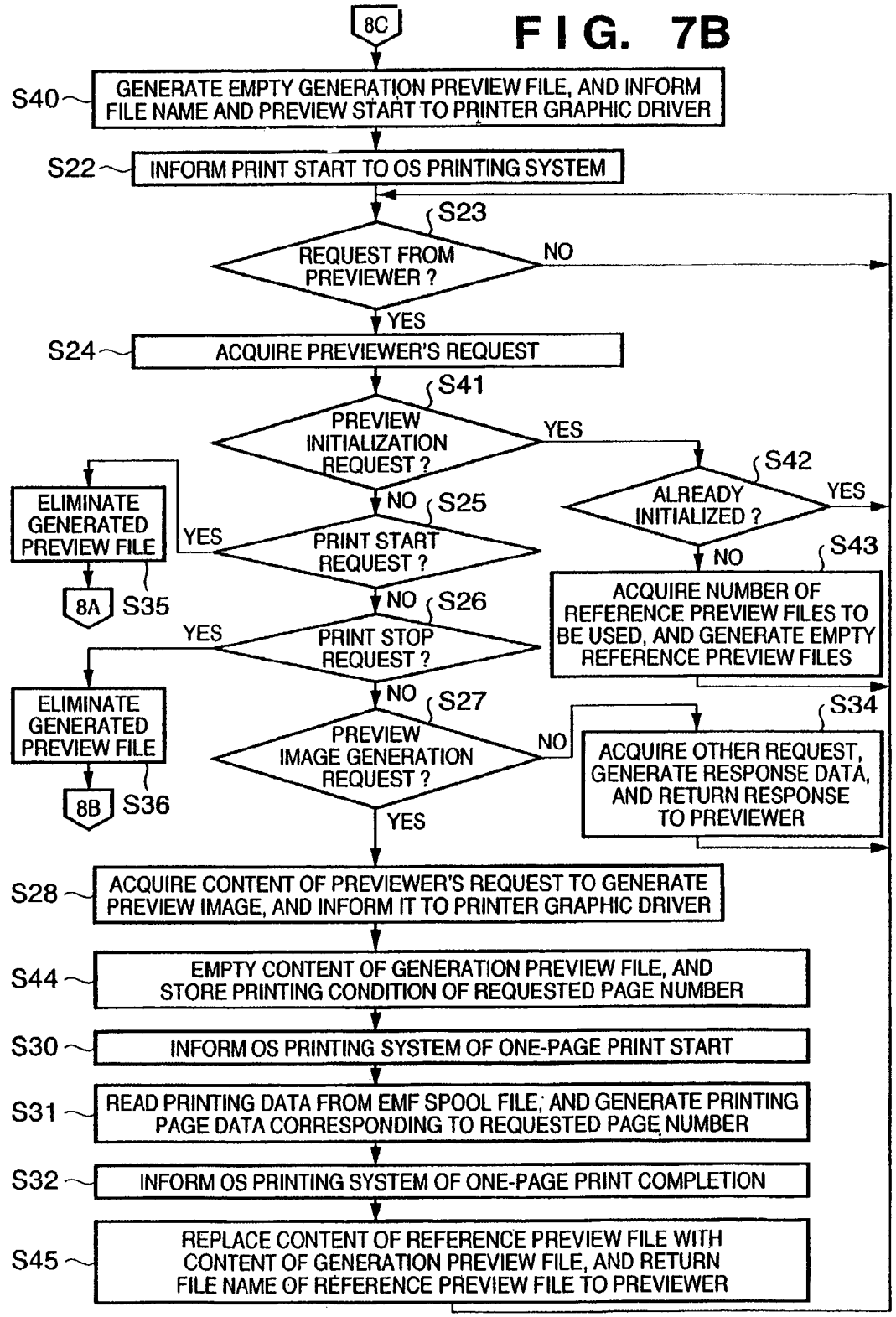

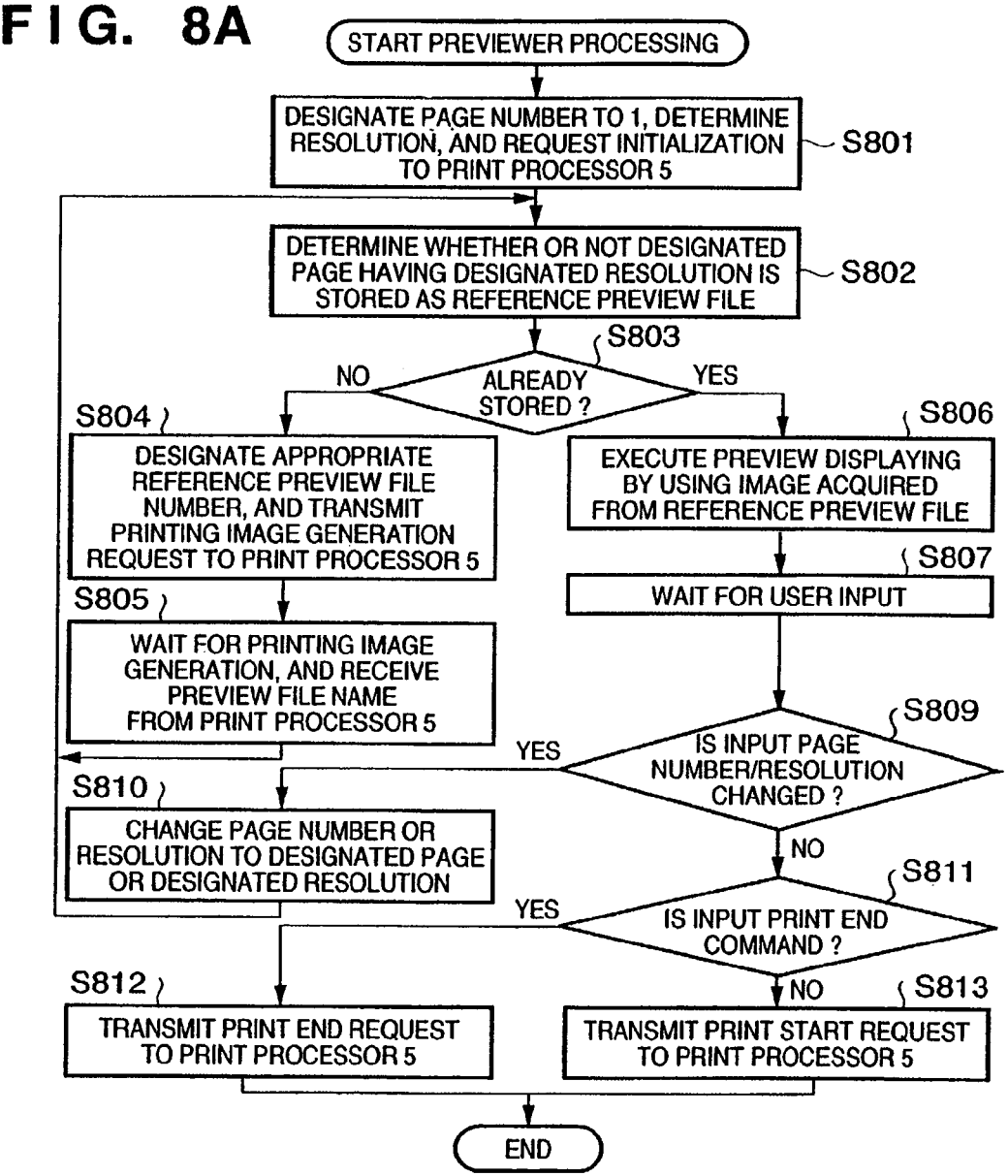

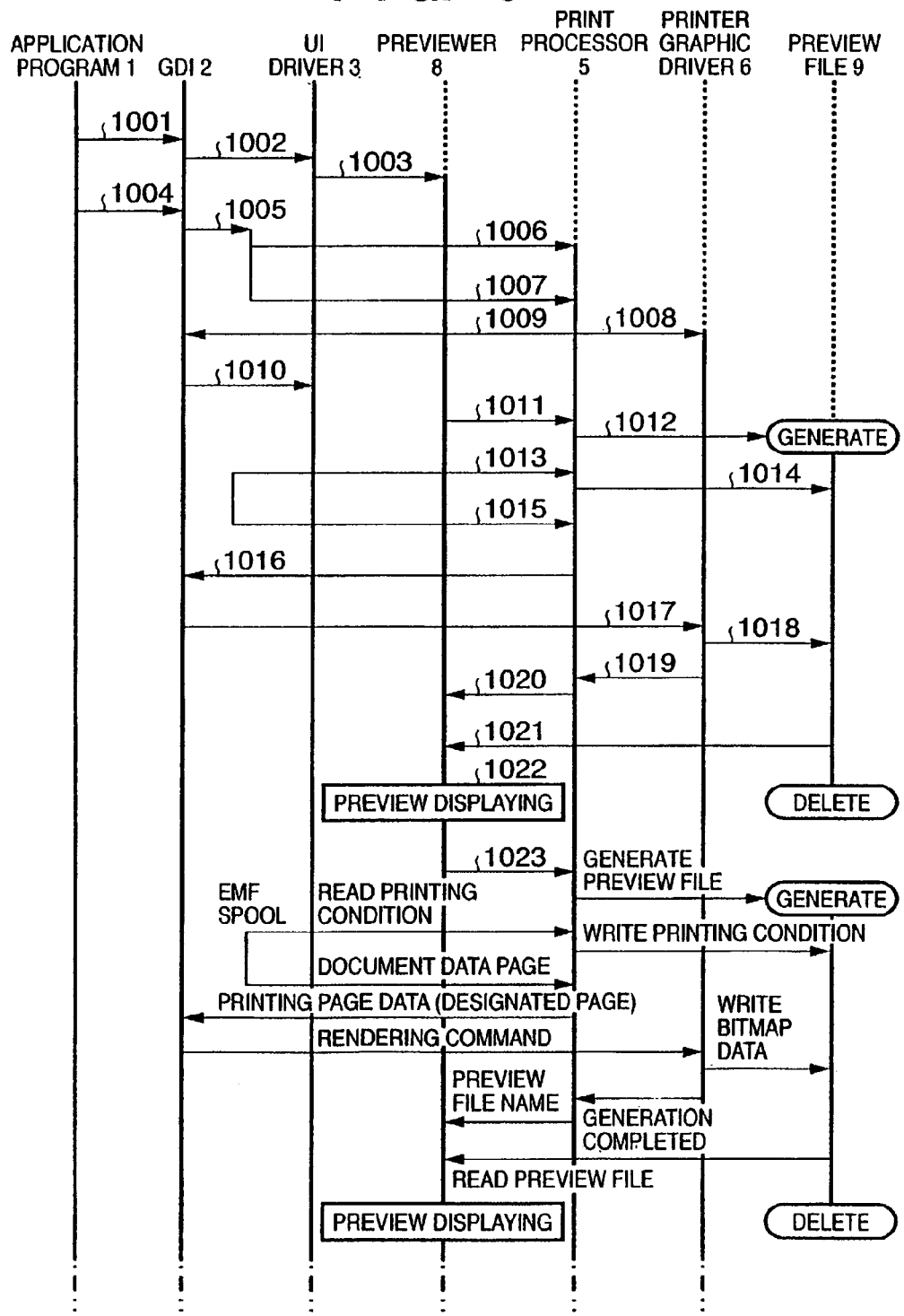

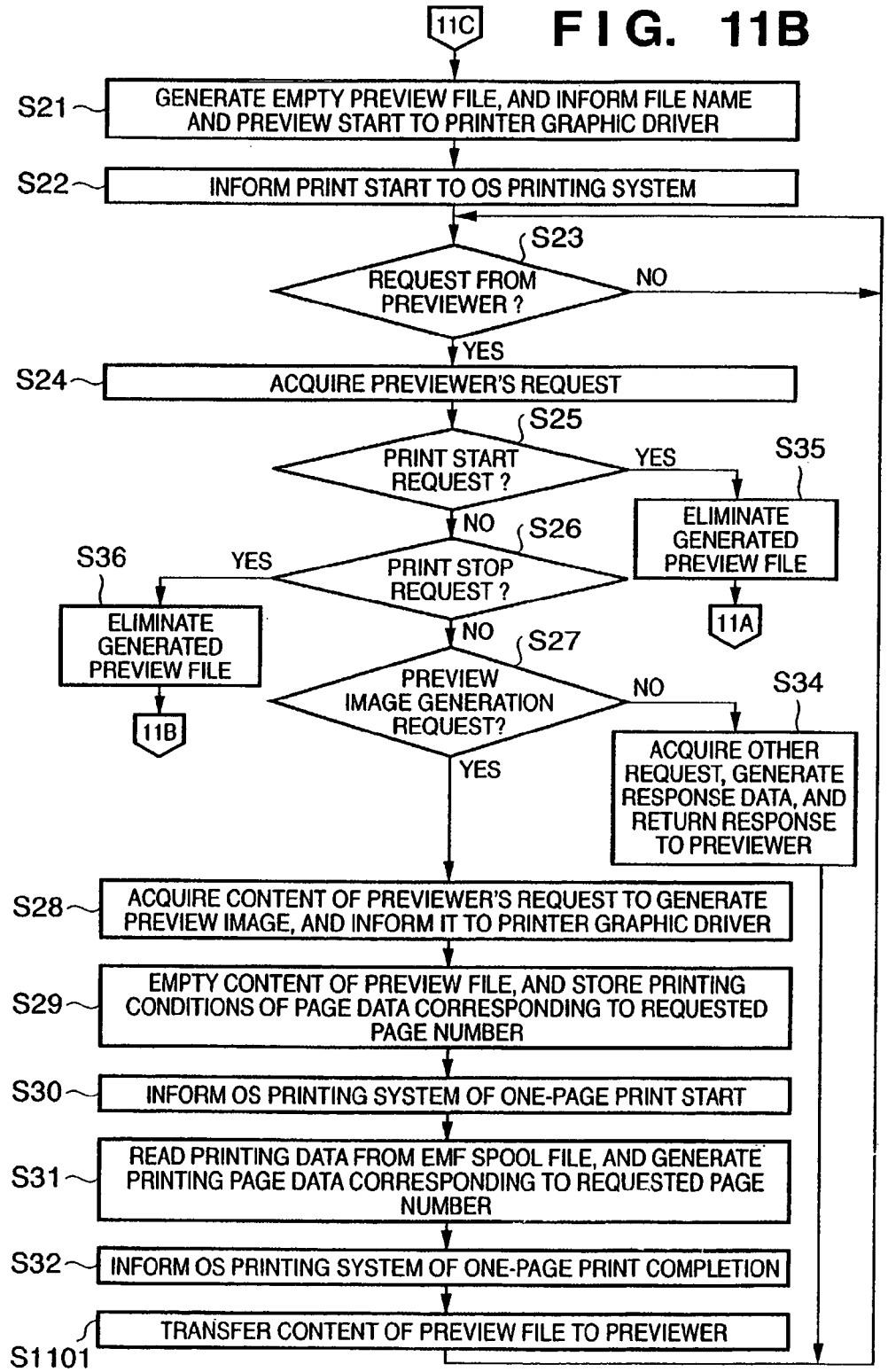

PRINT CONTROL APPARATUS AND METHOD

This application is a divisional of application Ser. No. 10/303,981, filed Nov. 26, 2002, now allowed, the contents of which are incorporated by reference herein.

FIELD OF THE INVENTION

The present invention relates to a print control apparatus having a so-called preview function which, for instance, displays a printing image before print processing, a print control method, and a printing system.

BACKGROUND OF THE INVENTION

In general, there are two methods for acquiring a printing image and displaying the image on a screen before a printing operation. The first method is to interpret a print command transmitted to a printer by a computer connected to the printer, and develop the printing data in units of C, M, Y, and K planes to be synthesized as a printing image. The second method is to transmit a print command from a host computer to a printer, and receive a printing image generated inside the printer by the host computer which then displays the image.

In addition, in a network environment, there are two more methods for displaying a printing image on a screen. The third method is to interpret a print command transmitted to a printer by a printer server which locally connects printers to provide the network with printer functions, and develop the printing data in units of C, M, Y and K planes to be synthesized as a printing image in the printer server. The fourth method is to supply a printer or a printer server with a print command by a host computer, which requests the printer server or printer to perform printing through a network, then acquire from the printer a printing image generated inside the printer or printer server by the host computer through the network, and display the image.

Furthermore, in a printing system employing a computer which incorporates Microsoft Windows® as an operating system, printing data generated by an application program or the like is stored in a system-standard spool file. Therefore, the printing data stored in the spool file cannot be accessed freely. For this reason, a printer driver comprises a preview function which enables an access to printing data by spooling the printing data in its unique form (unique spooling) and performs printing-image generation for displaying a printing image (fifth method).

However, the above-described conventional art has the following problems to be solved.

In the first and third methods where a host computer interprets a print command transmitted to a printer and generates a printing image, although extremely accurate printing image data can be obtained, the size of image data increases in proportion to a printer resolution. Therefore, a large amount of storage area is necessary. This problem remains even in a case where a printer server generates a printing image in a network environment.

Furthermore, in the second and fourth methods where a host computer acquires a printing image generated by a printer based on a print command, although extremely accurate printing image data can be obtained, the size of the image data increases in proportion to a printer resolution. Therefore, not only a large amount of storage area is necessary, but also an increased amount of time is required for transferring the printing image from the printer to the host computer. In the network environment, this not only increases the data transfer time, but also increases a network traffic, and may cause a communication delay or disturbance.

Furthermore, in regard to the fifth method of using the unique spooling function of a printer driver in a printing system employing a computer which incorporates Microsoft Windows® as an operating system (OS), since the fifth method has a low affinity to the OS, it is necessary to continuously develop the unique spooling function in accordance with a future improvement or specification changes of the OS. Therefore, it raises a problem of an increased development cost.

SUMMARY OF THE INVENTION

The present invention has been proposed in view of the foregoing conventional art, and has as its object to provide a print control apparatus, method, and printing system, which can efficiently execute displaying of a high-quality preview image with a small storage area, and which has a simple configuration to suppress a development cost while maintaining a high affinity to an operating system.

In order to attain the above object, the present invention has the following configuration.

More specifically, the present invention provides a print control apparatus having a function to temporarily store intermediate data to be outputted in accordance with a print designation of document data. The print control apparatus comprises: preview means adapted to transmit an image generation request in response to the print designation in a case where screen display execution of a printing image is designated, and display image data based on information related to image data generated in accordance with the image generation request; image data generation means adapted to generate image data; and processor means adapted to read the temporarily stored intermediate data in accordance with the image generation request to cause the image data generation means to generate the image data, and inform the preview means of the information related to the generated image data.

In the detailed description of the preferred embodiments, the aforementioned preview means corresponds to the previewer; the image data generation means corresponds to the printer graphic driver; and the processor means corresponds to the print processor.

It is preferable that the image generation request involves designation of a size or resolution of the image data to be generated, and the processor means causes the image data generation means to generate the image data with the designated size or resolution.

Furthermore, it is preferable that the image generation request includes a page number subjected to image data generation in the document data, and the processor means reads the intermediate data to cause the image data generation means to generate image data which corresponds to the designated page number.

Furthermore, it is preferable that the image generation request includes a number of colors used in bitmap data to be stored in a printing image file, or a subtractive color process employed in bitmap data generation.

Furthermore, it is preferable that the processor means produces the designated number of files for storing the image data to be generated by the image data generation means, and stores the image data generated by the image data generation means in the files, and in a case where image data corresponding to the printing image designated for screen display execution is stored in the file, the preview means reads the image data out of the file and displays the image data.

Furthermore, it is preferable that the preview means transmits an inquiry to the processor means as to whether or not printing data subjected to printing is stored as intermediate data, and the processor means returns a response to the inquiry to the preview means.

Furthermore, it is preferable that the preview means is included in a client apparatus which transmits the print designation of document data, and the image data generation means and the processor means are included in a server apparatus which is connected to a printing apparatus and the client apparatus, and that the processor means supplies the preview means with the image data itself as information related to the generated image data.

Furthermore, it is preferable that the processor means reads the temporarily stored intermediate data in accordance with a print start request, to cause the image data generation means to generate printing data, and printing is performed by a printing apparatus based on the generated printing data.

Moreover, according to another aspect, the present invention provides a print control apparatus comprising: a print setting processor including a setting unit in a printer driver which supplies a printer with printing data, the setting unit adapted to designate whether or not to execute screen display of a printing image of a document; a printing page processor adapted to generate printing page data by controlling a processing sequence of each page of the printing data of the document based on a setting of the print setting processor; an image generation processor adapted to generate bitmap data of the printing page data and supplies the bitmap data to a printing unit; and a printing image display unit adapted to display the bitmap data as the printing image, and switch printing image display in accordance with a user input. In a case where screen display execution of the printing image is designated in the print setting processor, the printing page processor generates the printing page data in accordance with a request from the printing image display unit, the image generation processor stores the bitmap data in a printing image file, and the printing image display unit displays the printing image on a screen by utilizing the printing image file.

Moreover, according to another aspect, the present invention provides a print control apparatus comprising: an application program; a user interface driver started for operation by a print event informed by a printing system of an operating system which interprets a print command transmitted by the application program; a previewer started for operation by the user interface driver; a print processor capable of arranging in page unit printing data of each page of printing document data, which is transmitted by the application program, in a form of page description language; and a printer graphic driver adapted to generate image data. Herein, the application program generates printing document data; the user interface driver starts up the previewer in accordance with a print event, informed by the printing system of the operating system, based on a driver property set along with a print request of the printing document data; the print processor generates printing page data by processing each page of the printing document data, and supplies the generated printing page data to the printer graphic driver; the printer graphic driver generates bitmap data of the printing page data and stores the generated bitmap data in a printing image file; and the previewer displays the bitmap data, stored in the printing image file, on a screen.

In an environment where a client computer is connected with a server computer by communications, it is preferable that the application program, the user interface driver, and the previewer operate on the client computer, and that the print processor and the printer graphic driver operate on the server computer.

Moreover, according to another aspect of the present invention, a previewer which performs displaying of a printing image is started up by utilizing a print event notification from an operating system. Printing data from an application program is stored by utilizing a standard spooling function. At the time of despooling the data, a print processor notifies a printer graphic driver to generate a printing image. Further, the print processor communicates with the previewer to acquire a print image generation request, including a resolution or page number necessary to generate the printing image, notifies the resolution to the printer graphic driver, and controls generation of printing page data that corresponds to the requested page number. The printer graphic driver converts the printing page data to a bitmap image to be stored in a printing image file as a preview image. The print processor returns the name of the completed printing image file to the previewer. The previewer displays on a screen a preview image, stored in the printing image file, in accordance with a response of the print processor. In accordance with a user operation, the previewer requests a printing image of an arbitrary printing page to the print processor, and acquires a new printing image to switch the display of the printing image. Also, the previewer requests a print start or a print stop to the print processor in accordance with a user operation, thereby designating a start or stop of print processing.

The print processor, which has received a print start request from the previewer, designates normal printing to the printer graphic driver, and sequentially generates printing page data from the first page to the last page.

The printer graphic driver, which has received a normal printing designation from the print processor, converts the printing page data to a bitmap image, supplies the bitmap image to a printer, and completes the normal print processing.

It is preferable that the preview means further transmits an inquiry to the processor means as to a total number of pages to be outputted at the time of actually printing the document data subjected to printing, and the processor means returns a response to the inquiry to the preview means.

Moreover, according to another aspect, the present invention provides a preview apparatus comprising: preview image generation means adapted to generate a preview image to be stored in a generation preview file; preview means adapted to cause displaying of a preview image to be stored in a reference preview file; and replacement means adapted to replace a content of the reference preview file designated by the preview means with a content of the generation preview file, after the preview image generated by the preview image generation means is stored in the generation preview file.

Moreover, according to another aspect, the present invention provides a preview method utilizing a generation preview file which stores a preview image generated by preview image generation means and a reference preview file which stores a preview image displayed by preview means, wherein after the preview image generated by the preview image generation means is stored in the generation preview file, a content of the reference preview file designated by the preview means is replaced with a content of the generation preview file.

Moreover, according to another aspect, the present invention provides a preview program utilizing a generation preview file which stores a preview image generated by preview image generation means and a reference preview file which stores a preview image displayed by preview means, wherein after the preview image generated by the preview image generation means is stored in the generation preview file, a content of the reference preview file designated by the preview means is replaced with a content of the generation preview file.

Furthermore, according to another aspect, the present invention provides a preview method of a printer driver, performing previewing operation based on printing data, which is supplied from an application program and spooled by a standard spool function of an operating system.

Furthermore, according to another aspect, the present invention provides a printer driver, comprising preview means adapted to perform previewing operation based on printing data, which is supplied from an application program and spooled by a standard spool function of an operating system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a block diagram showing hardware of a printing system according to an embodiment of the present invention;

FIG. 6 is a block diagram showing a printing system according to the second embodiment of the present invention;

FIGS. 7A and 7B are flowcharts showing a printing page processing of a print processor according to the second embodiment of the present invention;

FIG. 8A is a flowchart showing processing of a previewer according to an embodiment of the present invention;

FIG. 8B shows a table storing a file name, a page number and a resolution of the page of a preview image.

FIG. 9 is a chart showing a sequence of a processing performed by the printing system according to the first embodiment of the present invention;

FIGS. 11A and 11B are flowcharts showing a printing page processing of a print processor according to the third embodiment of the present invention.

DETAILED DESCRIPTION OF THE PREFERRED EMBODIMENTS

Preferred embodiments of the present invention will now be described in detail in accordance with the accompanying drawings.

First Embodiment

Hereinafter, the first embodiment of the present invention is described by using a concrete example.

Figure 1:
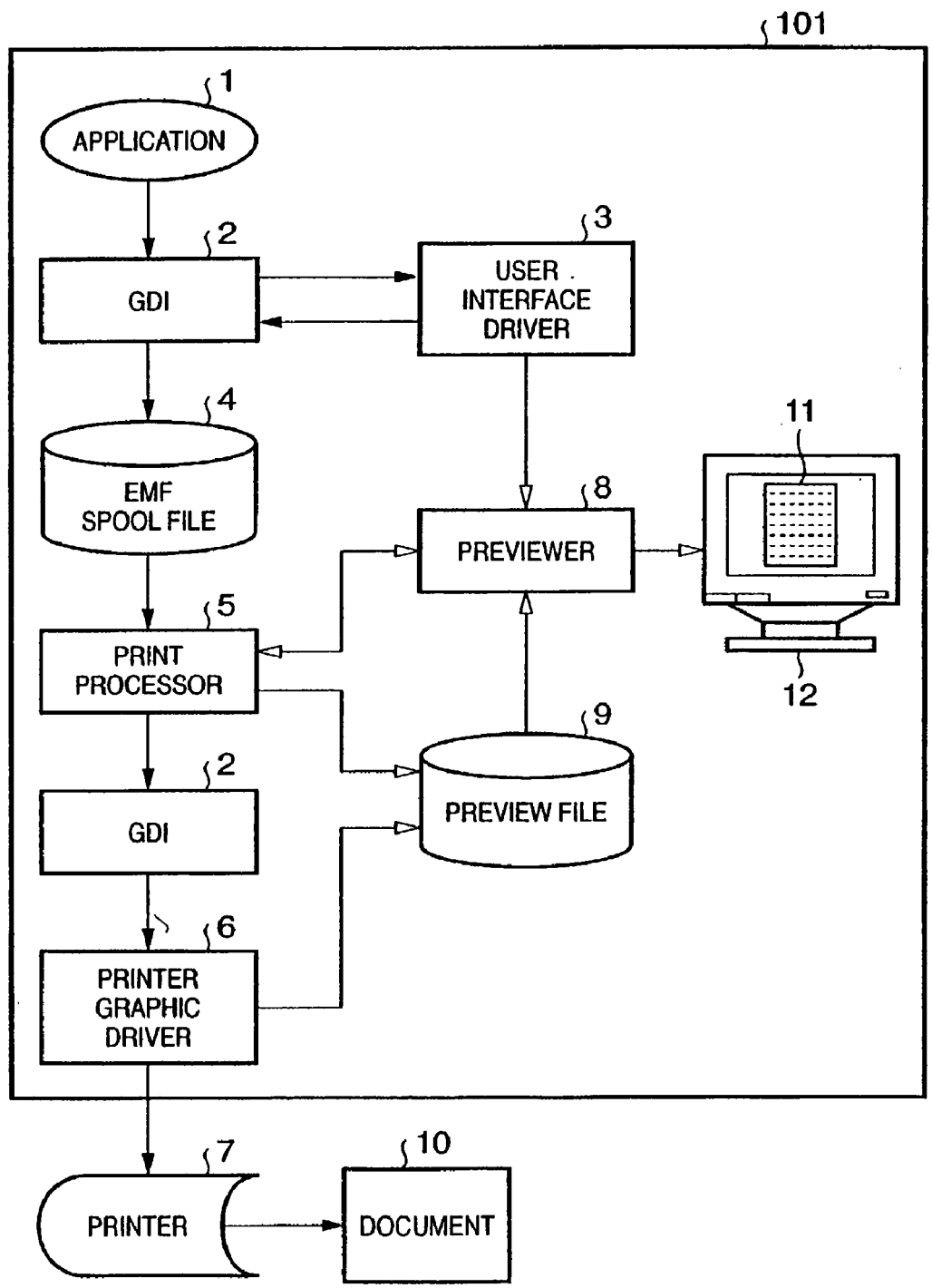
FIG. 1 is a block diagram showing a printing system according to the first and second embodiments of the present invention.

FIG. 1 is a block diagram showing a data flow at the time of printing and print previewing in a printing system according to the first embodiment of the present invention. Referring to FIG. 1, modules related to the present invention are: the previewer 8 serving as a printing-image display unit, user interface driver 3 having a function for starting up the previewer 8 and including a print setting processor, print processor 5 serving as a print page processor, and printer graphic driver 6 serving as an image generation processor. The printer graphic driver 6 not only transmits generated printing data to a printer through an output function of an operating system, but also stores a file as a designated file name. The printer graphic driver 6 can generate printing data in a bitmap-data form or in a language processable by a printer. To execute previewing, a preview file 9, serving as a printing image file, is temporarily generated. Note in this embodiment, Windows provided by Microsoft Corporation is employed as an operating system.

In the printing system shown in FIG. 1, printing data, e.g., a document or the like, generated by an application program 1 in a host unit 101, e.g., a personal computer or the like, is temporarily stored as intermediate printing data in an EMF spool file 4 through a GDI 2, and converted to bitmap data. The bitmap data is supplied from the host unit 101 to the printer 7 for printing. Note that a document herein includes texts and data having graphic contents such as graphics, tables, or bitmap images, or data including graphic contents only.

The application program 1 is provided by an application program. The GDI 2 is provided by an operating system. The user interface driver 3, print processor 5, printer graphic driver 6, and previewer 8 are provided by a printer driver program supplied by a printer manufacturer.

Herein, the GDI is a graphic device interface that is a Windows graphic engine. The GDI is a module performing graphic processing, e.g., screen displaying or printing, on Windows. The GDI receives a command from the application program, converts the command into a form interpretable by a device driver (in this embodiment, a printer driver), and transmits it to the device driver.

The EMF is short for an Enhanced Meta File that is a logical storage form of rendering data in Windows. In an EMF spool file, printing data is stored in the EMF form. In the printing system of this embodiment, a standard spool function of the OS is used for preview displaying.

The user interface driver 3 generally provides functions for setting a paper size used in printing, a printing direction, and other attributes. In addition to the setting of attributes such as a paper size, the user interface driver 3 in this embodiment comprises a print setting processor that provides a function for preview setting, which determines whether or not a printing image is to be displayed in a display unit before print processing. Values set through the user interface driver 3 are called printing conditions. A user can set printing conditions, including execution/non-execution of preview displaying, by using the function, provided by the print setting processor, on the user interface screen. When the printing conditions are changed by a user, the changed printing condition is returned to the application program 1. In this embodiment, assume that preview execution is set in the printing conditions, in other words, the preview setting included in the printing conditions is set to "preview display execution." The printing conditions are stored in a file device, e.g., a magnetic disk or the like, as a part of the EMF spool file 4, and are referred to by the user interface driver 3, or print processor 5. The preview setting in the printing conditions is realized by a flag indicative of e.g., "execution of preview display" or "non-execution of preview display". Hereinafter, the state of "preview display" set in the preview setting will be referred to as "preview display execution".

<Brief Description of Preview Displaying Steps>

FIG. 9 is a chart showing a sequence of preview display processing in the construction shown in FIG. 1 with respect to the first page and a next designated page of a document. In the following description, numbers in parentheses indicate reference numerals in FIG. 9.

When the application program 1 receives a designation to print a document from a user, e.g., an operator or other programs, it transmits a print start command (1001) through the GDI 2 to a printing system of the OS for printing the document. The GDI 2 informs the user interface driver 3 of a print start event (1002) transmitted by the application program 1. When the user interface driver 3 receives the print start event, it starts up the previewer 8 (1003) if preview display execution is set. Meanwhile, if preview display execution is not set, the previewer 8 is not started, and normal print processing is performed. In the following description, the case where preview display execution is set will be described.

The application program 1 continues print processing by supplying the GDI 2 with the printing data of the document (1004). The printing data supplied through the GDI 2 is stored in the EMF spool file 4 (1005). When the first page of the document's printing data is stored in the EMF spool file 4, the OS standard spooler starts up the print processor 5 (1006).

The print processor 5 is a module which reads in page unit the printout information and printing data from the EMF spool file 4 to generate printing page data, and supplies the printing page data in page unit to the printer graphic driver 6 through the GDI 2, when printing is to be executed in Windows. The print processor 5 in this embodiment, which is a module realizing the foregoing functions, serves also as the print page processor, and has a function to acquire a printing image generation request informed by the previewer 8 by communicating with the previewer 8. The printing image generation request includes information necessary for generating a printing image, e.g., a page number, resolution, and so on. Herein, the resolution designated is a resolution or image size corresponding to the size of a displaying image, or a resolution or image size corresponding to a displaying capability of the display device 12. For instance, in a case where an A-4 size vertical-oriented document is to be entirely displayed on a screen of 1600×1200 pixels, an image must be generated in a way that the vertical length of the image has about 1200 dots at most. If an image whose vertical length has 1200 pixels is displayed on a display device having 100 dpi, the page of the document is displayed approximately in an original size. As described above, the size of the image data to be generated is designated in accordance with the displaying capability. As a matter of course, if a display device is small, a small image size is designated accordingly. In a case of decreasing the display size, the decreased size is designated as a size of the image to be generated.

When the print processor 5 is started by the OS standard spooler (1006), the print processor 5 reads the printing conditions from the EMF spool file 4 (1007) and determines whether or not to execute preview displaying. As mentioned above, preview display execution is set in this description. A file name of the preview file 9 is first decided, and the file name is informed through the GDI 2 to the printer graphic driver 6 to notify the preview display processing. At the same time, the print processor 5 sends a print start request to the GDI 2 (1008, 1009). Next, when the print processor 5 receives the printing image generation request from the previewer 8, the print processor 5 generates an empty preview file 9 (1011, 1012) and writes printing conditions of the page number, on which preview displaying is requested, in the preview file 9 (1013, 1014). Then, the print processor 5 reads the page of the document data necessary for printing-image generation from the EMF spool file 4 (1015), and generates printing page data of the requested page number to be supplied to the GDI 2 (1016). Printing page data is data for each page having a GDI command form, which is obtained by rearranging the EMF data for each page read out of the EMF spool file 4 as necessary. For instance, EMF data corresponding to two pages, which is read out of the EMF spool file 4, is rearranged into one page of printing page data to realize the so-called 2-up function.

When the GDI 2 receives the print start request from the print processor 5, the GDI 2 informs the user interface driver 3 of the print start event transmitted by the print processor 5 (1010).

The printer graphic driver 6, serving as an image generation processor, generates bitmap data based on a graphic rendering command (1017), which is generated by the GDI 2 based on the printing page data supplied by the print processor 5. The printer graphic driver 6 additionally stores the generated bitmap data in the preview file 9 as preview image data (1018), using the preview file name notified in advance by the print processor 5. When the printer graphic driver 6 completes generation of the requested preview image data, it notifies the completion as a response to the print processor 5 (1019).

After the printer graphic driver 6 completes storing the preview image data, the print processor 5 returns the file name of the preview file 9 to the previewer 8 (1020). The preview file 9 includes the printing conditions stored by the print processor 5, and preview image data stored by the printer graphic driver 6.

The previewer 8 acquires from the preview file 9 the preview image data corresponding to the requested page number and printing conditions of the page by using the preview file name returned by the print processor 5 (1021), displays the preview image on the display device 12 serving as display means, and obtains a preview image 11 (1022). The previewer 8, operated by a user through a user interface included in the previewer shown in FIG. 4, repeats communication with the print processor 5 to acquire a preview image to be displayed next in accordance with the user operation (1023). Note that the preview file may be eliminated when the preview image is displayed, or a single preview file may be used by overwriting the content until preview display processing is completed.

When a user designates displaying of another page through the user interface, step 1011 and the subsequent steps are repeated.

As has been described above, by virtue of having the printer graphic driver 6 generate not only printing data but also preview image data, it is possible to generate preview image data based on the printing data spooled by an operating system. Furthermore, since preview image data is generated in designated page unit, the storage area necessary for storing the preview image data is kept to one page at most, even in a case the image data has a highest resolution.

<Brief Description of Printing Steps>

Next, a description is provided on a case where a user designates a print start in the previewer 8. The previewer 8 requests a print start to the print processor 5. The print processor 5 informs the printer graphic driver 6 through the GDI 2 that the request is an actual printing, reads printing data of the application program 1 from the EMF spool file 4, and generates printing page data in page unit from the first physical page to the final physical page to be sequentially supplied to the GDI 2.

The printer graphic driver 6, to which actual printing has been informed, generates bitmap data from the graphic rendering command generated by the GDI 2, converts the bitmap data to a print command, and supplies it to the printer 7 through a data transmission unit (not shown). The printer 7, serving as an output device, performs printing on printing paper based on the print command transmitted by the printer graphic driver 6, and a physical printing page 10 shown in FIG. 1, which is a print result, is obtained.

Note in a case where "non-execution of preview display" is set in the preview setting, the previewer 8 is not started. Instead, the print processor 5 requests a print start to the GDI 2, reads printing data of the application program 1 from the EMF spool file 4, and generates printing page data in page unit from the first physical page to the final physical page to be sequentially supplied to the GDI 2. Printing is completed without displaying a preview.

<Processing of User Interface Driver>

Figure 2:
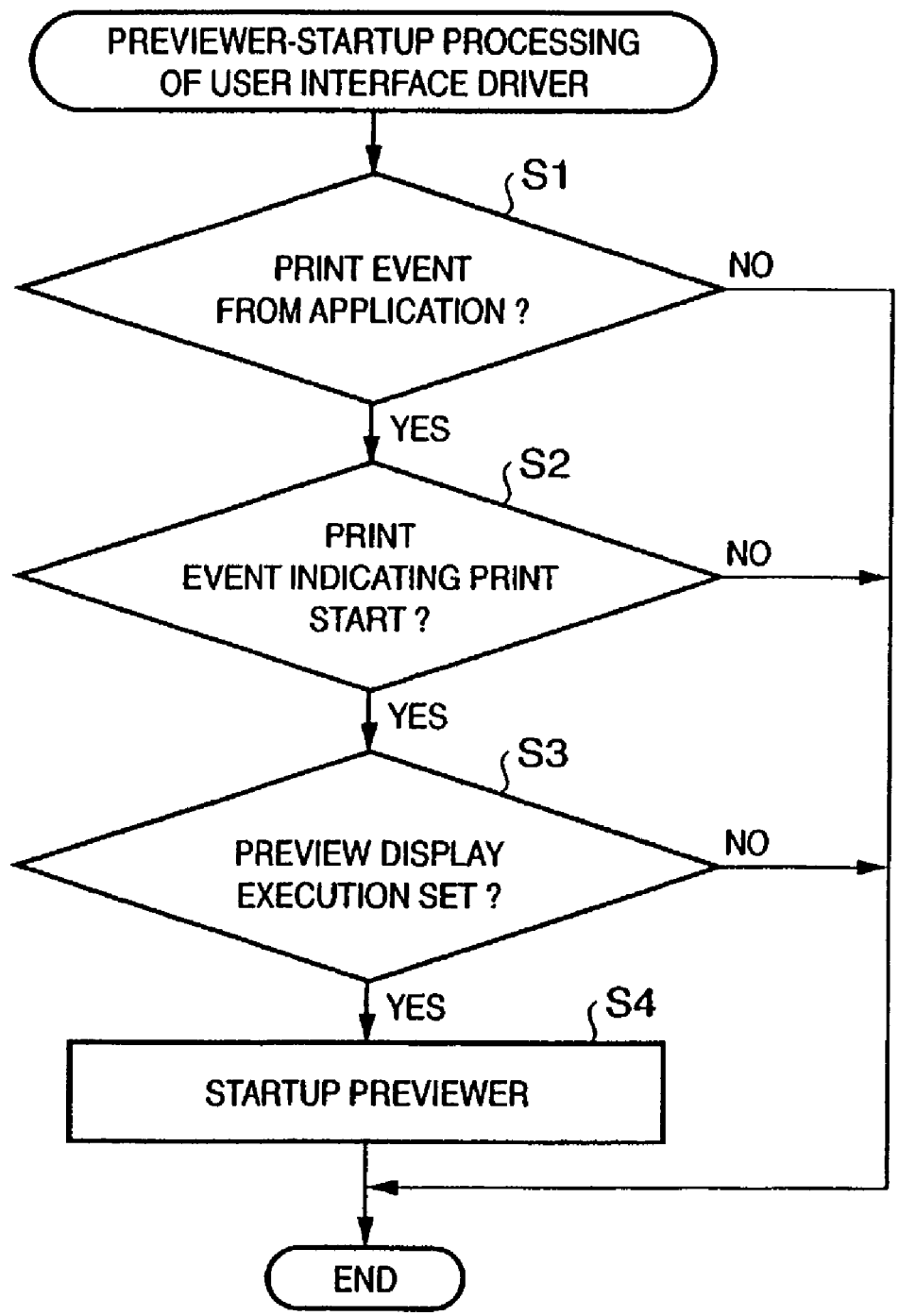
FIG. 2 is a flowchart showing a previewer startup processing of a user interface driver according to an embodiment of the present invention.

FIG. 2 is a flowchart showing a processing of starting up the previewer 8 by the user interface driver 3 according to the first embodiment. The user interface driver 3 operates based on a print event informed by the GDI 2.

In step S1, it is determined whether or not the event is a print event transmitted by the application program 1. If it is not a print event from the application program 1, the control ends. If it is a print event transmitted by the application program 1, the control proceeds to step S2. Note that a print event not transmitted by the application program 1 is, for instance, a print event transmitted by the print processor 5.

In step S2, the type of the print event is determined. If the print event indicates a print start, the control proceeds to step S3. If the print event indicates an event other than a print start, the control ends.

In step S3, the preview setting included in the printing conditions is referred to determine whether or not preview display execution is set. If preview display execution is set, the control proceeds to step S4 to start up the previewer, and the control ends. If preview display execution is not set, the control ends.

<Processing of Print Processor>

Print page processing of the print processor 5 according to the first embodiment is described with reference to the flowcharts in FIGS. 3A and 3B which show a print page processing of the print processor 5.

Figure 3A:
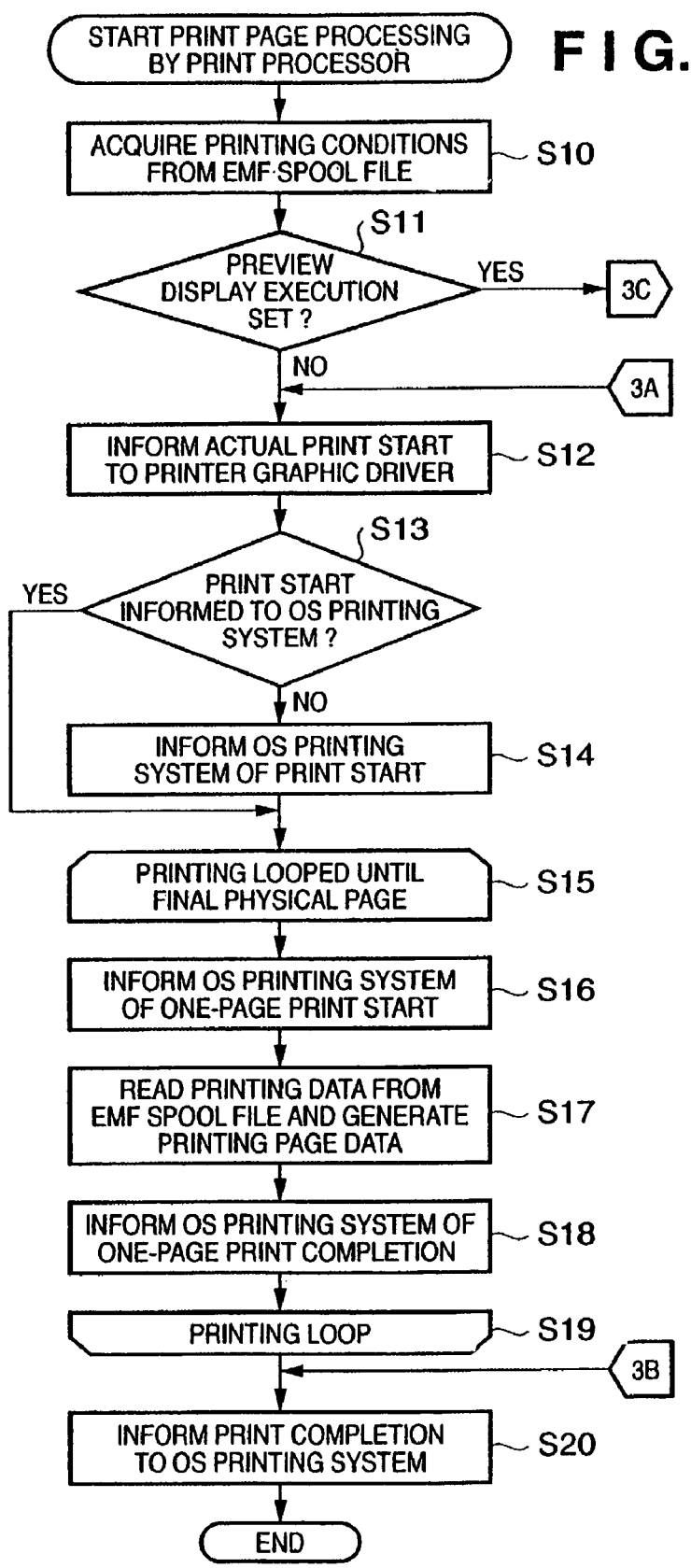
FIGS. 3A and 3B are flowcharts showing a printing page processing of a print processor according to the first embodiment of the present invention.
Figure 3B:
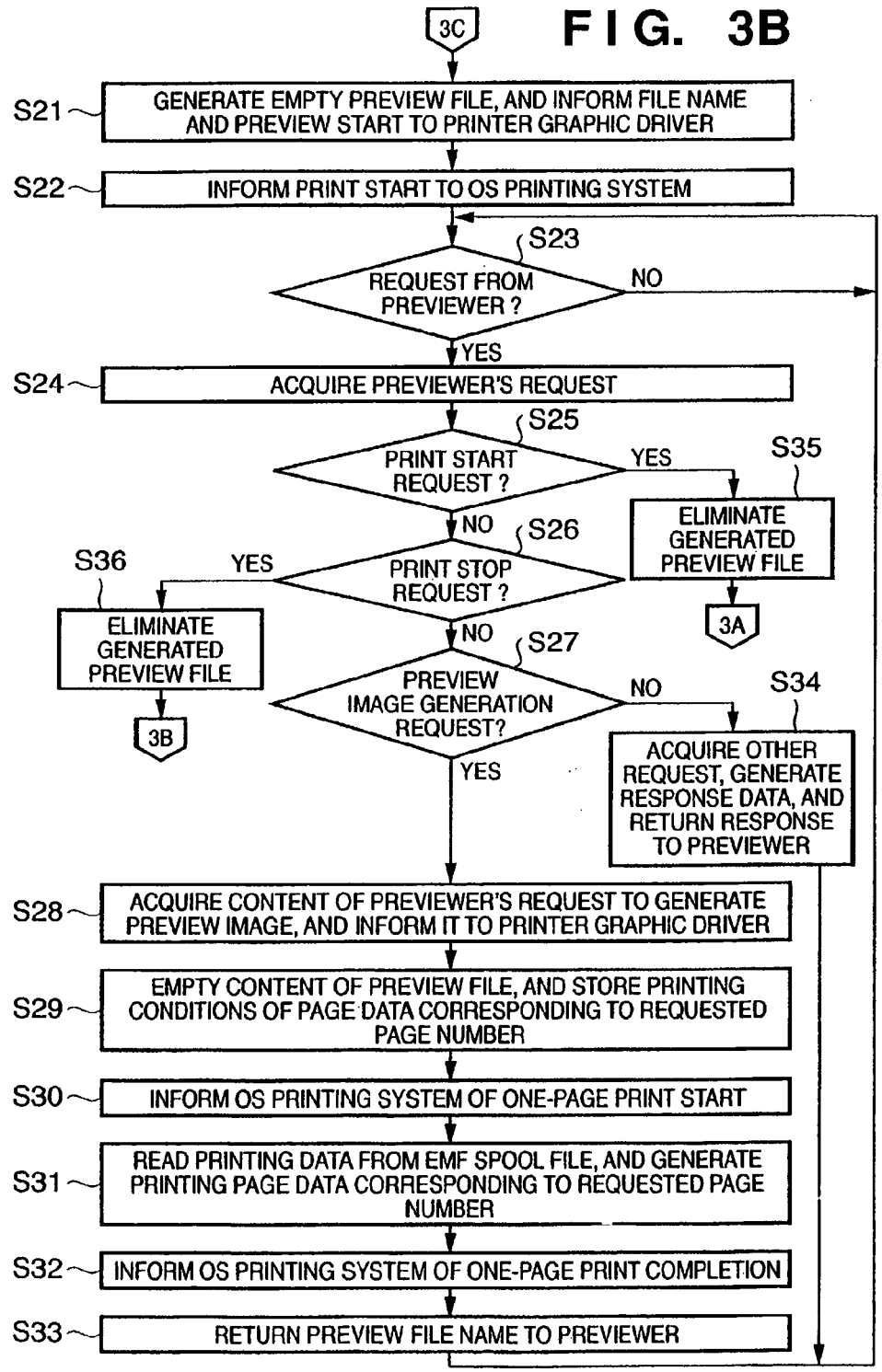

The print processor 5 is started up by the OS standard spooler to initiate the steps in FIGS. 3A and 3B when the application program 1 starts print processing and at least one page of document data is stored in the EMF spool file 4. In other words, the print page processing performed by the print processor 5, shown in FIGS. 3A and 3B, is executed in units of print job.

In step S10, printing conditions of the print job is acquired from the EMF spool file. In step S11, it is determined whether or not preview display execution is set in the printing conditions. If preview display execution is not set, the control proceeds to step S12 to perform normal printing. If preview display execution is set, the control proceeds to step S21 to perform preview processing.

<Preview Processing>

In step S21, a preview file 9 having an empty content is generated for storing a preview image and its printing conditions, and the file name is informed to the printer graphic driver 6.

In step S22, a print start is informed to the printing system of the OS (i.e., GDI 2).

In step S23, the print processor waits for a request from the previewer 8. If there is a request, the control proceeds to step S24 for acquiring a request of the previewer 8. Herein, a request is realized by a message having a predetermined form for communication between processes.

In step S25, the type of the request from the previewer 8 is determined. If it is a print start request, the control proceeds to step S35 to perform normal print processing. If it is not a print start request, the control proceeds to step S26.

In step S35, the preview file 9 generated in step S21 is eliminated, and normal print processing is performed in step S12.

In step S26, the type of the request from the previewer 8 is determined, and if it is a print stop request, the control proceeds to step S36 to terminate print processing of the print job. If it is not a print stop request, the control returns to step S27.

In step S36, the preview file 9 generated in step S21 is eliminated, and the print processing of the print job ends in step S20.

In step S27, the type of the request from the previewer 8 is determined, and if it is a preview image generation request, the control proceeds to step S28 to perform preview image generation processing. If it is not a preview image generation request, the control proceeds to step S34 to perform processing of other requests.

In step S34, processing is performed for a request other than the print start request, print stop request, and preview image generation request, among various types of request from the previewer 8. For instance, if the total number of printable pages (total number of pages) is requested, the total number of pages is prepared as a response to the previewer 8. For instance, if a request inquires whether or not the printing data from the application program 1 is being spooled, a flag indicative of whether or not it is being spooled is prepared as a response to the previewer 8. After an appropriate response to the request is generated, the response is transmitted to the previewer 8. Upon responding to the request, the control proceeds to step S23 to wait for a request from the previewer.

Figure 4:
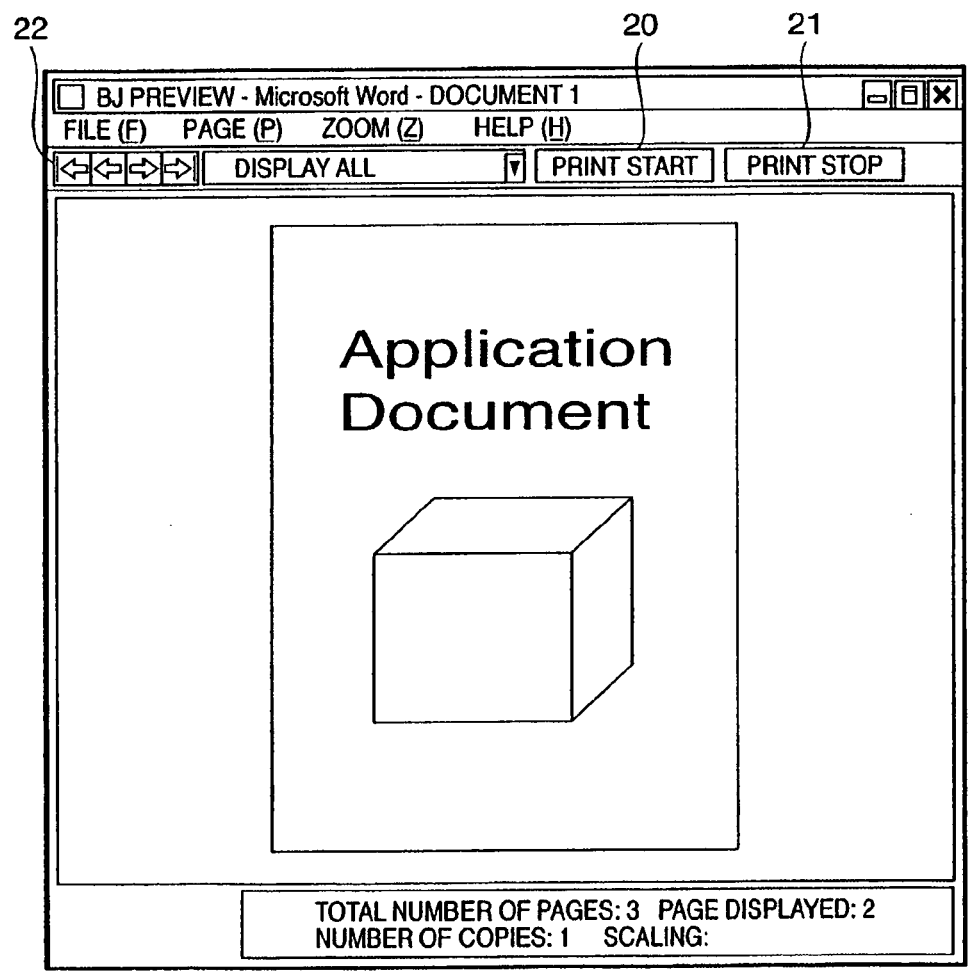
FIG. 4 is a view showing a user interface of a previewer according to an embodiment of the present invention.

The previewer 8 displays the total number of pages, acquired in response to the request, in the field of "total number of pages" in FIG. 4 (in the example in FIG. 4, 3 pages). In a case where a user clicks the right-end button of the four buttons 22 shown in FIG. 4, the final page of the document is previewed since the total number of pages is known.

In step S28, the content of the request transmitted by the previewer 8 is acquired, and information necessary to perform preview image generation is obtained. Herein, the content of the request transmitted by the previewer 8 is, for instance, information about a page number of printing page data to be generated by the print processor 5, the number of pixels in the horizontal and vertical lengths of the preview image to be generated, a resolution of a preview image to be generated, or a number of colors or subtractive color process employed in the preview image generation. As a matter of course, the content of the request may be any one of the aforementioned information, or a combination of plural information. Note that the page number is essential information. The information about the content of the acquired request is informed to the printer graphic driver 6.

In step S29, the content of the preview file 9 is emptied, and printing conditions corresponding to the printing page data of the requested page number is stored in the preview file 9.

In step S30, a one-page print start is informed to the OS printing system through the GDI 2.

In step S31, printing data is read out of the EMF spool file 4, and printing page data corresponding to the page number requested by the previewer 8 is generated and transmitted to the GDI 2.

In step S32, one-page print completion is informed through the GDI 2 to the OS printing system. Herein, the GDI 2 generates a graphic rendering command based on the printing page data, and transmits it to the printer graphic driver 6. The printer graphic driver 6 generates a bitmap image based on the graphic rendering command transmitted by the GDI 2, and additionally stores the bitmap image in the preview file 9 as a preview image.

In step S33, the file name of the preview file is transmitted in response to the preview image generation request from the previewer 8, and the control proceeds to step S23 to wait for the next request from the previewer 8. If any request is transmitted from the previewer 8, the above-described processing is performed in accordance with the request content.

<Print Processing>

In step S12, the print processor 5 informs the printer graphic driver 6 of a start of actual print processing.

In step S13, it is determined whether or not a print start has already been informed to the OS printing system. If so, the control proceeds to step S15 to perform printing of each page. If not, the control proceeds to step S14 to inform the OS printing system of a print start.

Steps S15 to S19 are looped until printing of each physical page is performed to the final physical page. In step S19, if printing for all the designated physical pages is not completed, printing processing of a physical page continues in step S16. When printing for all the designated physical pages is completed, the control proceeds to step S20 where print processing completion is informed to the OS printing system.

In step S16, a one-page print start is informed to the OS printing system.

In step S17, printing data is read out of the EMF spool file 4, and printing page data corresponding to each physical page is generated.

In step S18, the one-page print completion is informed to the OS printing system. The GDI 2 generates a graphic rendering command based on the printing page data, and transmits it to the printer graphic driver 6. The printer graphic driver 6 generates a bitmap image based on the graphic rendering command transmitted by the GDI 2, and supplies it to the printer 7.

In step S20, print completion is informed to the OS printing system and the control ends.

Print page processing of the print processor 5 shown in FIGS. 3A and 3B is performed in the foregoing manner. Each time the print processor 5 generates printing page data and informs the one-page print completion to the GDI 2 in step S32, the GDI 2 generates a graphic rendering command based on the printing page data and transmits it to the printer graphic driver 6. The printer graphic driver 6 generates bitmap data based on the graphic rendering command transmitted by the GDI 2. The generated bitmap data is additionally stored in the preview file 9 having a file name informed by the print processor 5 in step S21.

The previewer 8 acquires a preview image of a designated page number from the preview file 9 having a file name transmitted by the print processor 5 in step S33, and displays the preview image 11 on the display device 12.

Furthermore, each time the print processor 5 generates printing page data and informs one-page print completion to the GDI 2 in step S18, the printer graphic driver 6 which has received an actual print processing notice in step S12 generates bitmap data based on the printing page data, converts the bitmap data to a print command, and supplies it to the printer 7 through a predetermined data transmission processing (not shown) for printing a physical page. Note that the printer graphic driver 6, which may be capable of generating plural forms of printing data, does not always generate printing data in a bitmap form, but may generate printing data in a designated form of language. However, this is the printing data to be supplied to a printer. Therefore, a preview image is generated in a bitmap form.

<User Interface>

FIG. 4 shows a user interface of the previewer 8. The previewer 8 serves both as display means for displaying a preview image and a state of a printing job or the like, and as input means for changing a display method of the preview image. Operation buttons operated by a user include: the preview image page number switch buttons 22, enlargement/reduction designation field, print start button 20, and print stop button 21. The previewer 8 converts a user operation to a request and sends it to the print processor 5.

The screen shown in FIG. 4 is displayed when a print start is designated after preview setting is performed by the application program. The first page displayed in a preview display is an actual initial page of the document to be printed in accordance with the set printing conditions. The page number 1 is always assigned to this page. For instance, in a case where printing in reverse order is designated as the printing conditions, the preview image having the page number 1 corresponds to the final page of the document, as printing is started from the final page of the document. The previewer 8 transmits to the print processor 5 the page number 1 subjected to initial preview displaying, together with a preview image generation request. In accordance with an operation of the switch button 22, the previewer 8 increments or decrements the page number subjected to preview displaying, and transmits the new page number as well as a preview image generation request to the print processor 5. Note although a page number cannot be directly designated in the example shown in FIG. 4, an input field for allowing a page number designation may be provided, and a preview of the designated page number may be displayed.

When the print start button 20 is clicked, a print start request is issued to the print processor 5. This is the print start request determined in step S25 in FIG. 3B.

When the print stop button 21 is clicked, a print stop request is issued to the print processor 5. This is the print stop request determined in step S26 in FIG. 3B.

<Hardware Construction of Printing System>

Next, a block diagram showing hardware of the printing system according to the first embodiment is described. FIG. 5 is a block diagram describing a construction of the printing system according to the first embodiment.

Referring to FIG. 5, the CRT display device 101 displays a property setting window or the like provided by the user interface driver. The CRTC 102 is a controller for the display device. The user interface screen shown in FIG. 4 is displayed on the CRT 101.

The data input device (KB) 103, e.g., a keyboard or the like, can set a printing condition through, e.g., the user interface driver shown in FIG. 1. The keyboard controller (KBC) 104 controls the keyboard (KB) 103.

The pointing device (PD) 105 can perform operation such as a print stop operation or the like through, e.g., the user interface of the previewer shown in FIG. 4. The pointing device controller (PDC) 106 controls the pointing device (PD) 105.

The CPU 107 controls the entire apparatus. The CPU 107 executes a program which realizes the steps shown in the flowcharts of FIGS. 2, 3A, and 3B.

ROM 108 stores a boot program or the like.

RAM 109 stores an OS, application program, and programs for a user interface driver, printer pre-processor, or printer graphic driver, which are related to the system construction shown in FIG. 1 and flowcharts in FIGS. 2, 3A, and 3B. The RAM 109 is also used as a work area. Note that programs including the user interface driver 3, previewer 8, print processor 5, and printer graphic driver 6 are collectively referred to as a printer driver program.

The hard disk device (HDD) 110 stores an OS, application program, printer driver program including the programs related to the system construction shown in FIG. 1 and flowcharts in FIGS. 2, 3A, and 3B, font data, data file (preview file), and EMF spool file. The hard disk controller (HDC) 111 controls the hard disk device (HDD) 110.

The floppy disk device (FDD) 112, which is a driver for a portable storage medium, is controlled by the floppy disk controller (FDC) 113.

The interface (I/F) 114 is connected to the printer device (PR) 115, e.g., an inkjet printer, through an interface cable.

Each of these devices is connected by the bus 116.

When the power of the printing system is turned on, the CPU 107 starts up in accordance with the boot program stored in the ROM 108, loads the OS from the hard disk device 110, and waits for a user operation. When the user designates printing or changes in print setting of the printer driver by the KB 103 or PD 105 through the application program, or when an automatic startup is set, the printer driver program stored in the hard disk device 110 is loaded to the RAM 109 and executed. The construction shown in FIG. 1 is realized by executing a commercially available operating system as well as the program shown in FIGS. 2, 3A, and 3B by the construction in FIG. 5.

Effect of First Embodiment

As described above, when the print processor 5 supplies the printer graphic driver 6 with printing page data, the print processor 5 informs as to whether or not to generate a preview image as well as information necessary to generate the preview image, then generates printing page data by reading printing data out of the EMF spool file 4, and the printer graphic driver 6 generates a preview image that is a printing image based on the printing page data. In other words, the print processor enables intervention between a preview request of the previewer and image data generation of the printer graphic driver, and enables the printer graphic driver the generation of image data to be displayed and transmission of the generated image data to the previewer. Accordingly, preview image generation can be performed by using a standard spool function of an operating system, and therefore maintenance of the driver program is facilitated.

Furthermore, since a printing image does not need to be regenerated based on the print command transmitted to the printer 7, preview image generation can be realized with a small storage area.

Second Embodiment

Hereinafter, the second embodiment of the present invention is described by using a concrete example. FIG. 6 is a block diagram showing a printing system as the second embodiment of the present invention. The second embodiment is an example which employs a plurality of preview files in the printing system described in the first embodiment. A difference between FIG. 6 and FIG. 1 is described hereinafter.

The preview file in the second embodiment includes two types: a generation preview file 13 where the print processor 5 stores printing conditions and the printer graphic driver 6 additionally stores a preview image; and plural reference preview files 14 to which the previewer 8 refers for a preview image and its printing conditions. The print processor 5 according to the second embodiment communicates with the previewer 8 to acquire the number of reference preview files 14 as information regarding a preview initialization request, and a page number as well as a file number of the reference preview file 14 as information regarding a preview image generation request. Besides the above-described difference, the preview file is similar to that of the first embodiment.

<Brief Description of Preview Displaying>

First, a file name of the generation preview file 13 is informed to the printer graphic driver 6 through the GDI 2 to inform of the preview processing. The print processor 5, which receives a request from the previewer 8, writes printing conditions of the requested page number in the generation preview file 13. Then, the print processor 5 reads the page of the document data necessary for printing-image generation from the EMF spool file 4, and generates printing page data of the requested page number to be supplied to the GDI 2.

The printer graphic driver 6, serving as an image generation processor, additionally stores generated bitmap data in the generation preview file 13, using the file name notified in advance by the print processor 5.

After the printer graphic driver 6 completes storing the preview image data in the generation preview file 13, the print processor 5 replaces the content of the reference preview file 14, corresponding to the reference preview file number acquired from the previewer 8, with the content of the generation preview file 13, and returns the file name of the reference preview file 14 to the previewer 8. For instance, assuming that a reference preview file number designated by the previewer 8 is 1, the content of a first reference preview file 14-1 is replaced, and the file name of the first reference preview file 14-1 is returned to the previewer 8. If, for instance, a reference preview file number designated by the previewer 8 is 2, the content of a second reference preview file 14-2 is replaced with the content of the generation preview file 13, and the file name of the second reference preview file 14-2 is returned to the previewer 8. Note that although two reference preview files are described in this embodiment, the above description can be applied to a case of employing one or three or more preview files.

Based on the reference preview file 14 having a file name returned by the print processor 5, the previewer 8 acquires a preview image corresponding to the requested page number and printing conditions of the page, and displays the acquired preview image on the display device 12 in accordance with the printing conditions. As a result, the preview image 11 is obtained. The previewer 8, operated by a user, repeats communication with the print processor 5 to acquire a preview image to be displayed next in accordance with the user operation. If the reference preview file 14 including a preview image to be displayed next has already been generated in the past and still exists, the previewer 8 does not output a request to the print processor 5, but reuses the preview image stored in the existing reference preview file 14. The replacement processing of the content of the reference preview file 14 with the content of the generation preview file 13, which is performed by the print processor 5, may be realized by, for instance, copying the file or renaming the file.

Since the flowchart for starting up the previewer 8 by the user interface driver 3 is identical to the flowchart in FIG. 2 described in the first embodiment, description thereof is omitted.

<Processing of Previewer 8>

Processing steps of the previewer 8 is shown in FIG. 8A. The previewer 8 is started up by the user interface driver 3, and executes its processing in response to an event notification from the print processor 5 or user interface driver 3. Since the message or data exchange between the previewer 8 and print processor 5 has already been described above, description thereof is omitted. The steps shown in FIG. 8A are the case where the previewer 8 is started up by the user interface driver 3.

In step S801, a page number of a preview image to be displayed is designated to 1 as an initial value, a resolution for performing printing-image generation request is determined, and an initialization request is transmitted to the print processor 5. In steps S802 and S803, it is determined whether or not the designated page, subjected to preview displaying, has already been generated and stored as a reference preview file. This determination is performed by referring to the table shown in FIG. 8B and searching whether or not a designated page having a designated resolution is registered. If a file is found, the corresponding reference preview file exists. In the case where the corresponding reference preview file exists, image data is read out of the reference preview file to display a preview image in step S806. However, in the case where the corresponding reference preview file does not exist, in step S804 the previewer designates a reference preview file number where image data to be generated is to be stored, and transmits a printing image generation request of the designated page to the print processor 5. Thereafter, preview displaying is performed by the steps described in the aforementioned brief description. After the previewer 8 transmits a printing image generation request of the designated page to the print processor 5 and receives the generated reference preview file name from the print processor 5, the previewer 8 updates the table shown in FIG. 8B, and the control proceeds to step S802 to perform preview displaying. The previewer 8 updates the table shown in FIG. 8B by append the file number, the file name, the page number and the resolution of the generated preview image. After preview displaying is executed, in steps S807 and S809, the previewer 8 waits for a user input from the user interface shown in FIG. 4, and determines whether or not the user input is a page number change or a resolution change. If the user input is a page number change or a resolution change, in step S810, the page number or resolution is changed to the designated page or designated resolution, and the control returns to step S802 to change the preview display. Meanwhile, if the user input is not a page number change or a resolution change, in step S811, it is determined whether or not the user input is a print end command. If so, a print end request is transmitted to the print processor 5 in step S812. If the user input is not a print end command, a print start request is transmitted to the print processor 5 in step S813.

<Processing of Print Processor>

Figure 7A:
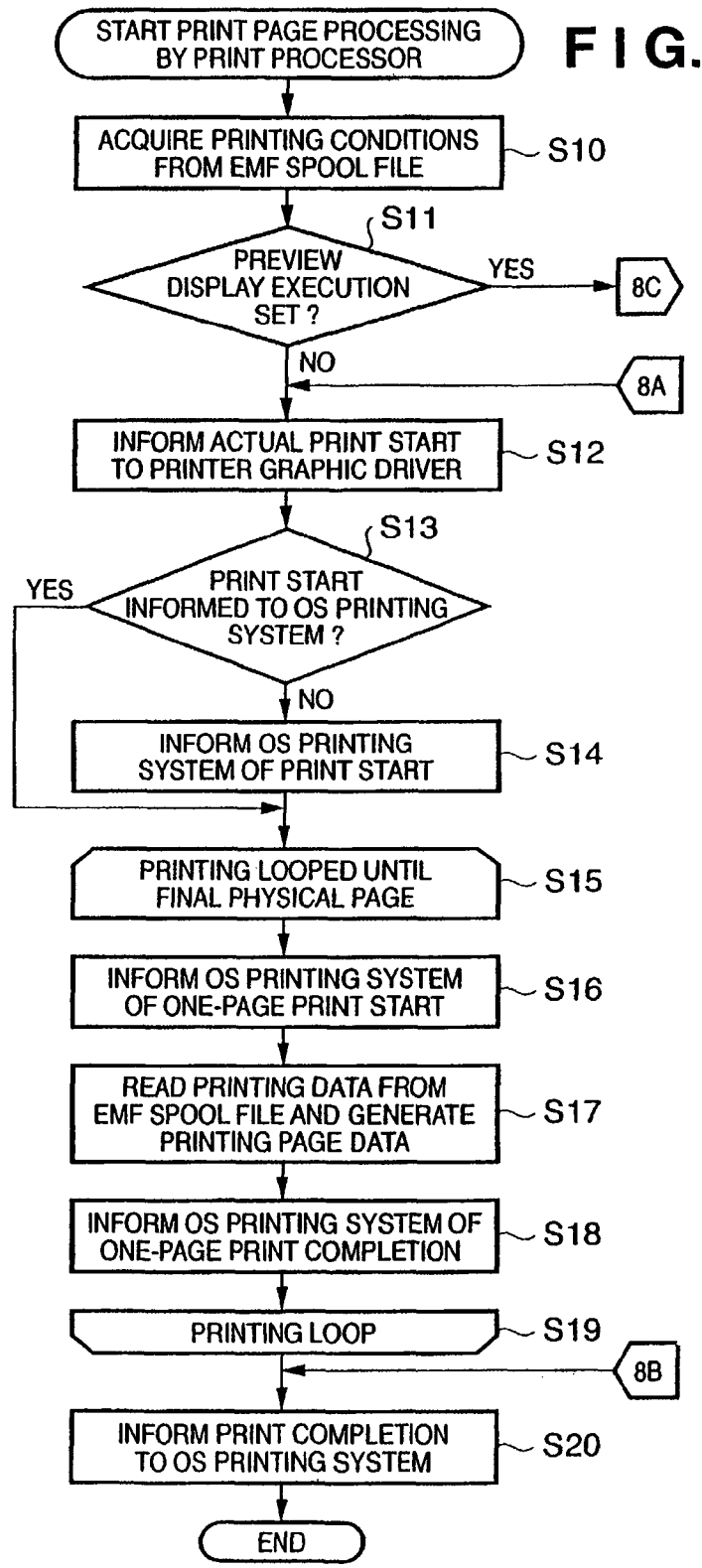

Next, print page processing of the print processor 5 according to the second embodiment is described with reference to the flowcharts in FIGS. 7A and 7B which show a print page processing of the print processor 5. The print processor 5 performs print page processing in units of print job. Note that steps in FIGS. 11A and 11B for executing the same processing as those described in FIGS. 3A and 3B are referred to by the same step numbers. Steps uniquely performed in FIGS. 7A and 7B are steps S40 to S45.

In step S10, printing conditions of a print job is acquired from the EMF spool file. In step S11, it is determined whether or not preview display execution is set in the printing conditions. If preview display execution is not set, the control proceeds to step S12 to perform normal printing. If preview display execution is set, the control proceeds to step S40 to perform preview processing.

In step S40, a generation preview file 13 having an empty content is generated for storing a preview image and its printing conditions, and the file name is informed to the printer graphic driver 6.

In step S22, a print start is informed to the printing system of the OS.

In step S23, the print processor waits for a request from the previewer 8. If there is a request, the control proceeds to step S24 for acquiring a request of the previewer 8.

In step S41, the type of request from the previewer 8 is determined. If the request is a preview initialization request, the control proceeds to step S42 to determine an initialization operation, while if the request is not a preview initialization request, the control proceeds to step S25.

In step S42, it is determined whether or not initialization has already been performed. If initialization has already been performed, the control proceeds to step S23 to wait for a request from the previewer 8. If initialization has not been performed, the control proceeds to step S43 to perform initialization.

In step S43, the number of reference preview files 14 to be used is acquired based on the content of the request from the previewer 8, and reference preview files 14 having an empty content are generated for the number requested. Then, in step S23, the print processor waits for a request from the previewer 8. At the time of initialization in step S43, fields of the table shown in FIG. 8B, which correspond to the initialized files, are also initialized by, for instance, null data.

In step S25, the type of the request from the previewer 8 is determined. If it is a print start request, the control proceeds to step S35 to perform normal print processing. If it is not a print start request, the control proceeds to step S26.

In step S35, the preview file generated in step S21 is eliminated, and normal print processing is performed in step S12.

In step S26, the type of the request from the previewer 8 is determined, and if it is a print stop request, the control proceeds to step S36 to terminate print processing of the print job. If it is not a print stop request, the control returns to step S27.

In step S36, the preview file generated in step S21 is eliminated, and the print processing of the print job ends in step S20.

In step S27, the type of the request from the previewer 8 is determined, and if it is a preview image generation request, the control proceeds to step S28 to perform preview image generation processing. If it is not a preview image generation request, the control proceeds to step S34 to perform processing of other requests.

In step S34, processing is performed for a request other than the print start request, print stop request, and preview image generation request, among various types of request from the previewer 8. For instance, if the total number of printable pages (total number of pages) is requested, the total number of pages is prepared as a response to the previewer 8. For instance, if a request inquires whether or not the printing data from the application program 1 is being spooled, a flag indicative of whether or not it is being spooled is prepared as a response to the previewer 8. After an appropriate response to the request is generated, the response is transmitted to the previewer 8. Upon responding to the request, the control proceeds to step S23 to wait for a request from the previewer.

In step S28, the content of the request transmitted by the previewer 8 is acquired, and information necessary to perform preview image generation is obtained. Herein, the content of the request transmitted by the previewer 8 is, for instance, information about a page number of printing page data to be generated by the print processor 5, the number of pixels in the horizontal and vertical lengths of the preview image to be generated, a resolution of a preview image to be generated, the number of colors or a subtractive color process employed in the preview image generation, or the reference preview file number which is to store a preview image to be generated. The information about the content of the acquired request is informed to the printer graphic driver 6.

In step S44, the content of the generation preview file 13 is emptied, and printing conditions corresponding to the printing page data of the requested page number is stored in the generation preview file 13.

In step S30, a one-page print start is informed to the OS printing system.

In step S31, printing data is read out of the EMF spool file 4, and printing page data corresponding to the page number requested by the previewer 8 is generated.

In step S32, one-page print completion is informed to the OS printing system. Herein, the printer graphic driver 6 generates a bitmap image based on the printing page data generated in step S31, and additionally stores the bitmap image in the generation preview file 13 as a preview image.

In step S45, the content of the reference preview file 14 having the requested number is replaced with the content of the generation preview file 13. In response to the preview image generation request from the previewer 8, a file name of the reference preview file 14 having the requested number is returned. Then, the control returns to step S23 to wait for a request from the previewer 8. Needless to say, the necessary memory capacity can be reduced by emptying the content of the generation preview file 13 after the content of the reference preview file 14 is replaced with the content of the generation preview file 13. Further, the previewer 8 registers the file name of the returned reference preview file, resolution, and page number subjected to preview, in the table shown in FIG. 8B with an established correlation.

Since steps S12 to S20 showing the actual print processing flow are identical to the steps shown in FIG. 3A of the first embodiment, the description is omitted.

The print page processing of the print processor 5 shown in FIGS. 7A and 7B is performed in the foregoing manner. Each time the print processor 5 generates printing page data and informs one-page print completion in step S32, the printer graphic driver 6 generates bitmap data based on the printing page data, and the generated bitmap data is additionally stored as a preview image in the generation preview file 13 having a file name informed in step S21. In step S45, the print processor 5 replaces the content of the reference preview file 14 with the content of the generation preview file 13, and returns the file name of the reference preview file 14 to the previewer 8. The previewer 8 acquires the preview image of the reference preview file 14 based on the returned file name, and displays a preview image on the display device 12.

Furthermore, each time the print processor 5 generates printing page data and informs one-page print completion in step S18, the printer graphic driver 6 which has received an actual print processing notice in step S12 generates bitmap data based on the printing page data, converts the bitmap data to a print command, and supplies it to the printer 7 through a predetermined data transmission processing (not shown) for printing a physical page.

Note that the maximum number of reference preview files generatable is predetermined in the previewer 8. In step S804 in FIG. 8A, if the number of files exceeds the maximum number, contents of the designated number of reference preview files are initialized in order of earliest files generated, and reused. Therefore, the memory area is kept to a predetermined size. By allowing a user to designate the maximum number of reference preview files, it is possible to set the number of files in accordance with the size of an available storage area. The user designation can be realized through, for instance, an input box or selection menu provided in the user interface screen in FIG. 4. An inputted value is stored in a memory or magnetic disk as the maximum number of reference preview files, and referred in step S804. The fields corresponding to the initialized files in the preview page table 800, which are referred to by the previewer 8, are initialized in accordance with the actual file status.

Since the user interface of the previewer 8 in the second embodiment is similar to that shown in FIG. 4 described in the first embodiment, description thereof is omitted.

Effect of Second Embodiment

As described above, the second embodiment is characterized by employing a plurality of reference preview files 14 which are referred to by the previewer 8, and the generation preview file 13 where the print processor 5 and printer graphic driver 6 respectively store printing conditions and preview images.

By virtue of this characteristic, the previewer 8 can reuse a preview image generated in the past by storing the image in the reference preview file. As a result, the necessary storage area can be kept to a minimum. In addition, print preview displaying is realized efficiently without imposing a load on the print processor 5 or printer graphic driver 6, which is caused by regenerating the same image.

Third Embodiment

Described as the third embodiment is a case of generating a preview image by a server computer in a network print system, where a client computer uses the server computer to perform printing.

Hereinafter, the third embodiment of the present invention is described by using a concrete example.

Figure 10:
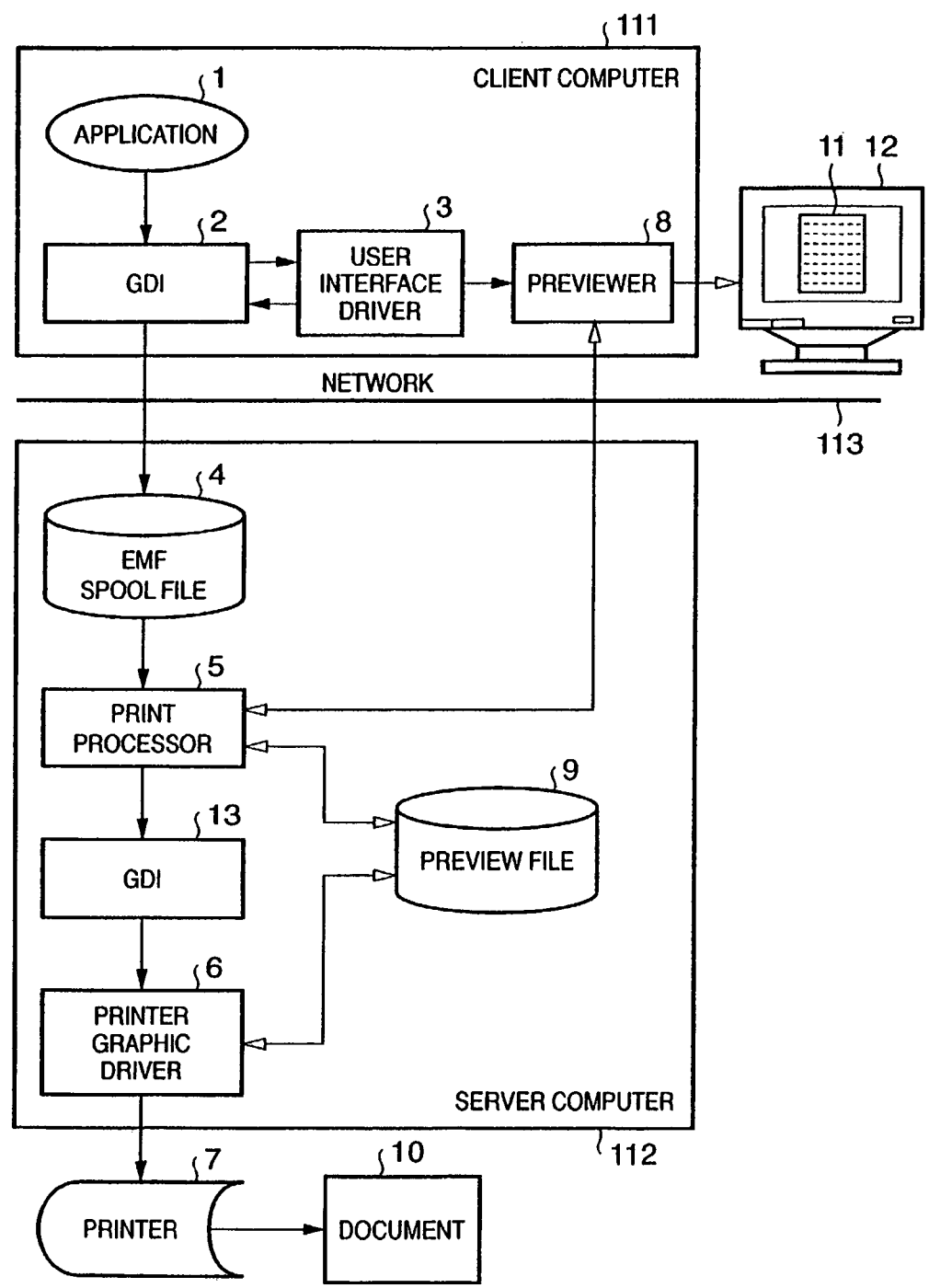
FIG. 10 is a block diagram showing a printing system according to the third embodiment of the present invention.

FIG. 10 is a block diagram showing a data flow at the time of printing and print previewing in the printing system according to the third embodiment. Referring to FIG. 10, modules related to the present invention are: the previewer 8 serving as a printing-image display unit, user interface driver 3 having a function for starting up the previewer 8 and including a print setting processor, print processor 5 serving as a print page processor, and printer graphic driver 6 serving as an image generation processor. The printer graphic driver 6 not only transmits generated printing data to a printer through an output function of an operating system, but also stores a file as a designated file name. The printer graphic driver 6 can generate printing data in a bitmap-data form or in a language processable by a printer. To execute previewing, a preview file 9, serving as a printing image file, is temporarily generated. Note in this embodiment, Windows provided by Microsoft Corporation is employed as an operating system. Note that a difference between the first embodiment and the third embodiment is in that a graphic rendering command generated by the GDI 2 of a client 111 is transmitted to a server computer 112 and spooled into the EMF spool file 4, and printing steps performed thereafter are executed by the server computer 112. Note in FIG. 10, although the line connecting the GDI 2 of the client computer 111 to the EMF spool file 4 of the server computer is shown independently of the line connecting the previewer 8 of the client computer 111 to the print processor 5 of the server computer 112, they are merely a schematic representation of the connection state between the modules. Electrically, the client and server computers are connected to the network 113 by, e.g., a single LAN cable.

The printing system in FIG. 10 is constructed such that printing data, e.g., a document, generated by the application program 1 operating in the client computer 111, e.g., a personal computer, is temporarily stored in the EMF spool file 4 of the server computer 112 through the GDI 2, then the printing data is converted to bitmap data by the server computer 112, and the converted bitmap data is supplied from the server computer 112 to the printer 7 for printing. Note with respect to the same configurations shown in FIGS. 1 and 10, detailed descriptions are omitted.

<Brief Description of Preview Displaying Steps>

When the application program 1 receives a designation to print a document from a user, e.g., an operator or other programs, it transmits a print start command through the GDI 2 to a printing system of the OS for printing the document. The GDI 2 informs the user interface driver 3 of a print start event transmitted by the application program 1. When the user interface driver 3 receives the print start event, it starts up the previewer 8 if preview display execution is set. Meanwhile, if preview display execution is not set, the previewer 8 is not started, and normal print processing is performed. In the following description, the case where preview display execution is set will be described.

The application program 1 continues print processing by supplying the GDI 2 with the printing data of the document. The printing data supplied through the GDI 2 is stored in the EMF spool file 4 of the server computer 112 via the network 113.

The print processor 5 operating in the server computer 112 is a module which reads in page unit the printout information and printing data from the EMF spool file 4 to generate printing page data, and supplies the printing page data to the printer graphic driver 6 through the GDI 13 of the server computer 112, when printing is to be executed in Windows. The print processor 5 in this embodiment, which is a module realizing the foregoing functions, serves also as the print page processor, and has a function to acquire a printing image generation request informed by the previewer 8 by communicating with the previewer 8 of the client computer 111 through the network 113. The printing image generation request includes information necessary for generating a printing image, e.g., a page number, resolution, and so on.

When the print processor 5 receives the printing image generation request, the print processor 5 generates an empty preview file 9, and notifies the file name to the printer graphic driver 6 through the GDI 13 to inform of the preview processing. Next, the print processor writes printing conditions of the page number, on which preview displaying is requested, in the preview file 9. Then, the print processor 5 reads the page of the document data necessary for printing-image generation from the EMF spool file 4, and generates printing page data of the requested page number to be supplied to the GDI 13.

The printer graphic driver 6, serving as an image generation processor, generates bitmap data based on a graphic rendering command, which is generated by the GDI 13 based on the printing page data supplied by the print processor 5. The printer graphic driver 6 additionally stores the generated bitmap data in the preview file 9 as preview image data, using the preview file name notified in advance by the print processor 5. When the printer graphic driver 6 completes generation of the requested preview image data, it notifies the completion as a response to the print processor 5.

After the printer graphic driver 6 completes storing the preview image data, the print processor 5 transmits the content of the preview file 9 to the previewer 8 of the client computer 112. The preview file 9 includes the printing conditions stored by the print processor 5, and preview image data stored by the printer graphic driver 6.

The previewer 8 of the client computer 111 acquires from the preview file 9 transmitted by the print processor 5 the preview image data corresponding to the requested page number and printing conditions of the page, displays the preview image on the display device 12 serving as display means, and obtains a preview image 11. The previewer 8, operated by a user through the user interface driver 3, repeats communication with the print processor 5 to acquire a preview image to be displayed next in accordance with the user operation. Note that the preview file 9 may be eliminated when it is transmitted from the server computer 112 to the client computer 111. The elimination of the preview file may be delayed until next preview file generation is requested. Further, a single preview file may be used by overwriting the content until preview display processing is completed, and may be eliminated when a print start or print end request is received.

As has been described above, by virtue of having the printer graphic driver 6 generate not only printing data but also preview image data, it is possible to generate preview image data based on the printing data spooled by an operating system. Furthermore, since preview image data is generated in designated page unit, the storage area necessary for storing the preview image data is kept to one page at most, even in a case the image data has a highest resolution.

<Processing of Print Processor>

Print page processing of the print processor 5 according to the third embodiment is described with reference to the flowcharts in FIGS. 11A and 11B which show a print page processing of the print processor 5.

Figure 11A:
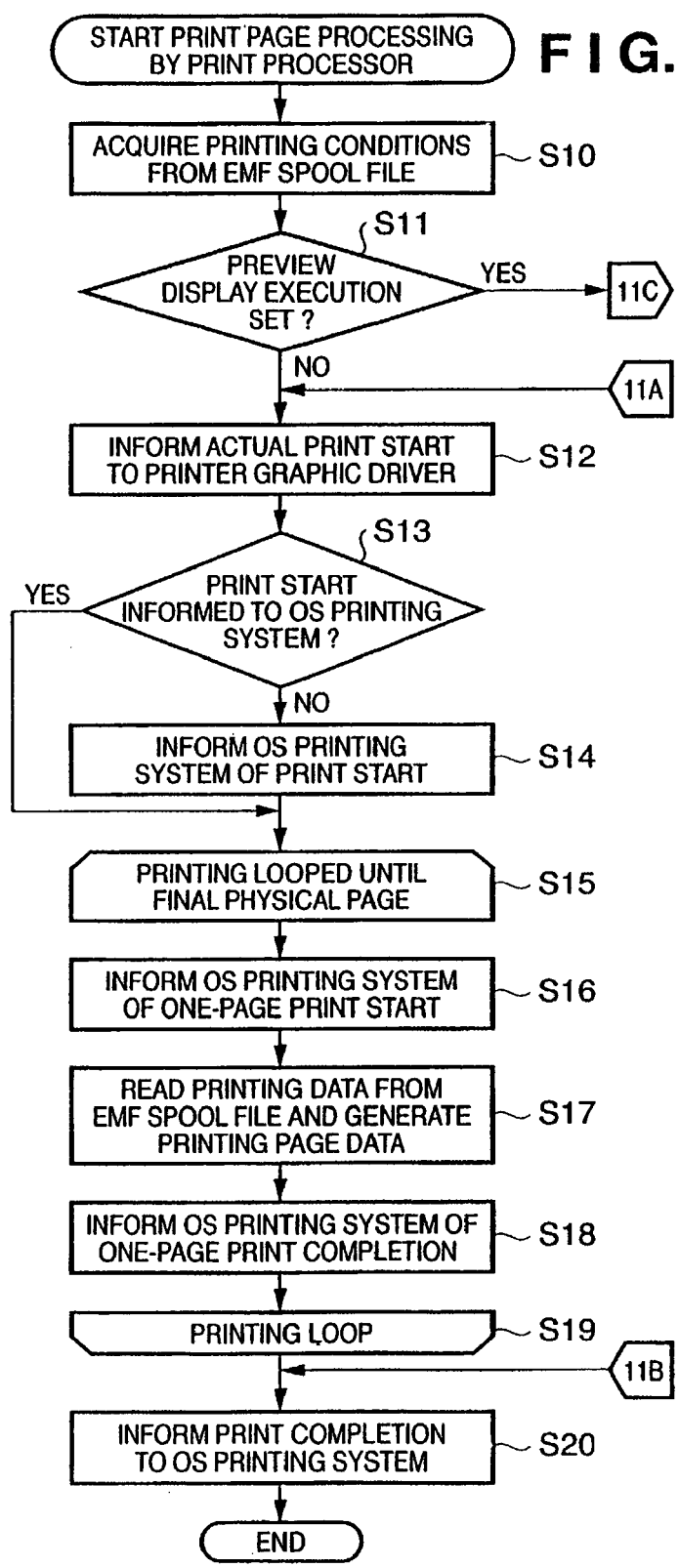

The print processor 5 starts the processing steps in FIGS. 11A and 11B when it receives a print image generation request from the previewer 8 of the client computer 111. The print page processing performed by the print processor 5, shown in FIGS. 11A and 11B, is executed in units of print job. Note that steps in FIGS. 7A and 7B for executing the same processing as those described in FIGS. 3A and 3B are referred to by the same step numbers.

In step S10, printing conditions of the print job is acquired from the EMF spool file. In step S1, it is determined whether or not preview display execution is set in the printing conditions. If preview display execution is not set, the control proceeds to step S12 to perform normal printing. If preview display execution is set, the control proceeds to step S21 to perform preview processing.

<Preview Processing>

In step S21, a preview file 9 having an empty content is generated for storing a preview image and its printing conditions, and the file name is informed to the printer graphic driver 6.

In step S22, a print start is informed to the printing system of the OS (i.e., GDI 2).

In step S23, the print processor waits for a request from the previewer 8. If there is a request, the control proceeds to step S24 for acquiring a request of the previewer 8. Herein, a request is realized by a message having a predetermined form for communication between processes.

In step S25, the type of the request from the previewer 8 is determined. If it is a print start request, the control proceeds to step S35 to perform normal print processing. If it is not a print start request, the control proceeds to step S26.

In step S35, the preview file 9 generated in step S21 is eliminated, and normal print processing is performed in step S12.

In step S26, the type of the request from the previewer 8 is determined, and if it is a print stop request, the control proceeds to step S36 to terminate print processing of the print job. If it is not a print stop request, the control returns to step S27.

In step S36, the preview file 9 generated in step S21 is eliminated, and the print processing of the print job ends in step S20.

In step S27, the type of the request from the previewer 8 is determined, and if it is a preview image generation request, the control proceeds to step S28 to perform preview image generation processing. If it is not a preview image generation request, the control proceeds to step S34 to perform processing of other requests.

In step S34, processing is performed for a request other than the print start request, print stop request, and preview image generation request, among various types of request from the previewer 8. For instance, if the total number of printable pages is requested, the total number of pages is prepared as a response to the previewer 8. For instance, if a request inquires whether or not the printing data from the application program 1 is being spooled, a flag indicative of whether or not it is being spooled is prepared as a response to the previewer 8. After an appropriate response to the request is generated, the response is transmitted to the previewer 8. Upon responding to the request, the control proceeds to step S23 to wait for a request from the previewer.

In step S28, the content of the request transmitted by the previewer 8 is acquired, and information necessary to perform preview image generation is obtained. Herein, the content of the request transmitted by the previewer 8 is, for instance, information about a page number of printing page data to be generated by the print processor 5, the number of pixels in the horizontal and vertical lengths of the preview image to be generated, a resolution of a preview image to be generated, or a number of colors or subtractive color process employed in the preview image generation. As a matter of course, the content of the request may be any one of the aforementioned information, or a combination of plural information. Note that the page number is essential information. The information about the content of the acquired request is informed to the printer graphic driver 6.

In step S29, the content of the preview file 9 is emptied, and printing conditions corresponding to the printing page data of the requested page number is stored in the preview file 9.

In step S30, a one-page print start is informed to the OS printing system through the GDI 13.

In step S31, printing data is read out of the EMF spool file 4, and printing page data corresponding to the page number requested by the previewer 8 is generated and transmitted to the GDI 2.

In step S32, one-page print completion is informed through the GDI 13 to the OS printing system. Herein, the GDI 13 generates a graphic rendering command based on the printing page data, and transmits it to the printer graphic driver 6. The printer graphic driver 6 generates a bitmap image based on the graphic rendering command transmitted by the GDI 13, and additionally stores the bitmap image in the preview file 9 as a preview image.

In step S1101, the content of the preview file is transmitted in response to the preview image generation request of the previewer 8, and the control proceeds to step S23 to wait for the next request from the previewer 8. If any request is transmitted from the previewer 8, the above-described processing is performed in accordance with the request content.

<Print Processing>

In step S12, the print processor 5 informs the printer graphic driver 6 of a start of actual print processing.

In step S13, it is determined whether or not a print start has already been informed to the OS printing system. If so, the control proceeds to step S15 to perform printing of each page. If not, the control proceeds to step S14 to inform the OS printing system of a print start.

Steps S15 to S19 are looped until printing of each physical page is performed to the final physical page. In step S19, if printing for all the designated physical pages is not completed, printing processing of a physical page continues in step S16. When printing for all the designated physical pages is completed, the control proceeds to step S20 where print processing completion is informed to the OS printing system.

In step S16, a one-page print start is informed to the OS printing system.

In step S17, the GDI 13 reads the printing data out of the EMF spool file 4, and generates printing page data corresponding to each physical page.

In step S18, the one-page print completion is informed to the OS printing system (GDI 13). The GDI 13 generates a graphic rendering command based on the printing page data, and transmits it to the printer graphic driver 6. The printer graphic driver 6 generates a bitmap image based on the graphic rendering command transmitted by the GDI 13, and supplies it to the printer 7.

In step S20, print completion is informed to the OS printing system and the control ends.

Print page processing of the print processor 5 shown in FIGS. 11A and 11B is performed in the foregoing manner. Each time the print processor 5 generates printing page data and informs the one-page print completion to the GDI 13 in step S32, the GDI 13 generates a graphic rendering command based on the printing page data and transmits it to the printer graphic driver 6. The printer graphic driver 6 generates bitmap data based on the graphic rendering command transmitted by the GDI 13. The generated bitmap data is additionally stored in the preview file 9 having a file name informed by the print processor 5 in step S21.

The previewer 8 acquires a preview image of a designated page number from the preview file 9 having a file name transmitted by the print processor 5 in step S1101, and displays the preview image 11 on the display device 12.

Furthermore, each time the print processor 5 generates printing page data and informs one-page print completion to the GDI 13 in step S18, the printer graphic driver 6 which has received an actual print processing notice in step S12 generates bitmap data based on the printing page data, converts the bitmap data to a print command, and supplies it to the printer 7 through a predetermined data transmission processing (not shown) for printing a physical page. Note that the printer graphic driver 6, which may be capable of generating plural forms of printing data, does not always generate printing data in a bitmap form, but may generate printing data in a designated form of language. However, this is the printing data to be supplied to a printer. Therefore, a preview image is generated in a bitmap form.

The server computer and client computer are configured with the hardware shown in FIG. 5, and the network interface (not shown).

Effect of Third Embodiment

As described above, when the print processor 5 supplies the printer graphic driver 6 with printing page data, the print processor 5 informs as to whether or not to generate a preview image as well as information necessary to generate the preview image, then generates printing page data by reading printing data out of the EMF spool file 4, and the printer graphic driver 6 generates a preview image that is a printing image based on the printing page data. Accordingly, preview image generation can be performed by using a standard spool function of an operating system, and therefore maintenance of the driver program is facilitated.

Furthermore, since a printing image does not need to be regenerated based on the print command transmitted to the printer 7, preview image generation can be realized with a small storage area.

Moreover, since a resolution most appropriate for displaying is obtained from the previewer 8, generating a larger preview image than is necessary can be prevented, and therefore, the amount of data transmitted to the network can be kept small.

The third embodiment can be combined with the second embodiment. In this case, a content of the reference preview file generated is transmitted from the server computer to the client computer, and the preview image is displayed on the client computer.

Effects of Present Invention

As has been set forth above, according to the present invention, since a resolution of a printing image can be designated from the previewer, a printing image having a size appropriate for displaying can be generated, and the necessary storage area can be kept to a minimum.

Furthermore, by virtue of using an OS standard spool function, the method according to this invention has a high affinity to the OS. Therefore, future maintenance is facilitated, and a development cost can be suppressed.

Moreover, in a printing system connected to a network, since preview image generation is performed by a server computer, a load imposed on a client computer can be reduced.

Still further, in the printing system connected to a network, image data having a resolution appropriate for preview displaying can be obtained. Therefore, it is possible to prevent transmission of unnecessarily large amount of data to the network, contributing to prevention of an increased network traffic.

The present invention is not limited to the above embodiment and various changes and modifications can be made within the spirit and scope of the present invention. Therefore, to apprise the public of the scope of the present invention, the following claims are made.

What is claimed is:

1. A printing system comprising:
a client; and
a server that uses a spool file provided by an operating system for temporarily storing intermediate data for output in response to an instruction to output document data,
wherein said client has a previewer and a user interface driver, and said server has a print processor and a graphical driver,
wherein said user interface driver activates said previewer if a preview setting has been set responsive to a print start event which has been received by said user interface driver,
wherein said print processor generates an empty preview file responsive to an image generation request received from said previewer, informs said graphical driver of a preview file name and start of preview, reads the intermediate data stored in the spool file to generate printing page data, and delivers the printing page data to the graphical driver,
wherein said graphical driver generates image data from the printing page data and stores the generated image data in the preview file, wherein said print processor transmits the image data stored in the preview file to said client, and
wherein said previewer performs a preview based on the image data received from said print processor of said server.

2. The printing system according to claim 1, wherein the preview file is deleted from said server when the preview file has been transmitted from said server to said client.

3. The printing system according to claim 1, wherein the preview file is deleted from said server when generation of the next preview file is requested.

4. The printing system according to claim 1, wherein the preview file is deleted from said server when a print start is requested.

5. A preview method performed by a printing system comprising a client and a server using a spool file provided by an operating system for temporarily storing intermediate data for output in response to an instruction to output document data, the client having a previewer and a user interface driver, and the server having a print processor and a graphical driver, said method comprising:
a step in which said user interface driver activates said previewer if a preview setting has been set responsive to a print start event which has been received by said user interface driver;
a step in which said print processor generates an empty preview file responsive to an image generation request received from said previewer, informs said graphical driver of a preview file name and start of preview, reads the intermediate data stored in the spool file to generate printing page data, and delivers the printing page data to the graphical driver,
a step in which said graphical driver generates image data from the printing page data and stores the generated image data in the preview file,
a step in which said print processor transmits the image data stored in the preview file to said client; and
a step in which said previewer performs a preview based on the image data received from said print processor of said server.

6. The preview method according to claim 5, further comprising a step in which said server deletes the preview file when the preview file has been transmitted from said server to said client.

7. The printing system according to claim 5, further comprising a step in which said server deletes the preview file when generation of the next preview file is requested.

8. The printing system according to claim 5, further comprising a step in which said server deletes the preview file when a print start is requested.

9. A non-transitory computer-readable storage medium retrievably storing a computer-executable program therein, the computer-executable program causing a client and a server to perform a preview method, the server using a spool file provided by an operating system for temporarily storing intermediate data for output in response to an instruction to output document data, the client having a previewer and a user interface driver, and the server having a print processor and a graphical driver, said method comprising:

a step in which said user interface driver activates said previewer if a preview setting has been set responsive to a print start event which has been received by said user interface driver;

a step in which said print processor generates an empty preview file responsive to an image generation request received from said previewer, informs said graphical driver of a preview file name and start of preview, reads the intermediate data stored in the spool file to generate printing page data, and delivers the printing page data to the graphical driver, a step in which said graphical driver generates image data from the printing page data and stores the generated image data in the preview file, a step in which said print processor transmits the image data stored in the preview file to said client; and a step in which said previewer performs a preview based on the image data received from said print processor of said server.

10. The non-transitory computer-readable storage medium according to claim 9, wherein said method further comprises a step in which said server deletes the preview file when the preview file has been transmitted from said server to said client.

11. The non-transitory computer-readable storage medium according to claim 9, wherein said method further comprises a step in which said server deletes the preview file when generation of the next preview file is requested.

12. The non-transitory computer-readable storage medium according to claim 9, wherein said method further comprises a step in which said server deletes the preview file when a print start is requested.

* * * * *